US 10,924,765 B2

(12) United States Patent
Deshpande

(10) Patent No.: US 10,924,765 B2
(45) Date of Patent: Feb. 16, 2021

(54) VIDEO BITSTREAM ENCODING AND DECODING WITH RESTRICTIONS ON SIGNALING TO IMPROVE VIEWER EXPERIENCE

(71) Applicant: Sharp Kabushiki Kaisha, Sakai (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/186,735

(22) Filed: Nov. 12, 2018

(65) Prior Publication Data

US 2019/0132612 A1    May 2, 2019

Related U.S. Application Data

(62) Division of application No. 15/118,153, filed as application No. PCT/JP2015/000832 on Feb. 20, 2015, now abandoned.

(Continued)

(51) Int. Cl.
*H04N 19/70* (2014.01)
*H04N 19/30* (2014.01)
(Continued)

(52) U.S. Cl.
CPC .......... *H04N 19/70* (2014.11); *H04N 19/124* (2014.11); *H04N 19/159* (2014.11); *H04N 19/188* (2014.11); *H04N 19/30* (2014.11); *H04N 19/436* (2014.11); *H04N 19/51* (2014.11); *H04N 19/619* (2014.11); *H04N 19/91* (2014.11)

(58) Field of Classification Search
None
See application file for complete search history.

(56) References Cited

U.S. PATENT DOCUMENTS 10,110,890 B2 * 10/2018 Haque ................... H04N 19/31
10,171,849 B1 * 1/2019 Hwang ................ H04N 21/816
(Continued)

OTHER PUBLICATIONS

"Series H: Audiovisual and Multimedia Systems, Infrastructure of audiovisual services—Coding of moving video" ITU-T Telecommunication Standardization Sector of ITU, H.265, Apr. 2013, 315 pages (Year: 2013).*

(Continued)

*Primary Examiner* — Tyler W. Sullivan
(74) *Attorney, Agent, or Firm* — Keating & Bennett, LLP

(57) ABSTRACT

A method for encoding a video bitstream by an encoder device includes generating hypothetical reference decoder parameters in a video parameter set, generating the video parameter set and a video parameter set video usability information syntax structure, and encoding the video bitstream having a constant picture rate. The hypothetical reference decoder parameters include a fixed picture rate general flag, a fixed picture rate coded video sequence flag and a temporal distance, the video parameter set includes a video parameter set video usability information present flag, and the video parameter set video usability information syntax structure includes a picture rate present video parameter set flag, a picture rate present flag, a constant picture rate value and an average picture rate.

2 Claims, 41 Drawing Sheets

Related U.S. Application Data

(60) Provisional application No. 61/943,879, filed on Feb. 24, 2014.

(51) Int. Cl.
```
H04N 19/91      (2014.01)
H04N 19/124     (2014.01)
H04N 19/159     (2014.01)
H04N 19/169     (2014.01)
H04N 19/436     (2014.01)
H04N 19/51      (2014.01)
H04N 19/61      (2014.01)
```

(56) References Cited

U.S. PATENT DOCUMENTS

| | | | | |
|---|---|---|---|---|
| 10,602,190 | B2* | 3/2020 | Deshpande | H04N 19/188 |
| 2002/0028061 | A1* | 3/2002 | Takeuchi | H04N 19/587 |
| | | | | 386/248 |
| 2007/0097104 | A1* | 5/2007 | Kuroki | H04N 9/12 |
| | | | | 345/204 |
| 2010/0098154 | A1* | 4/2010 | Lou | H04N 19/30 |
| | | | | 375/240.02 |
| 2014/0086336 | A1* | 3/2014 | Wang | H04N 19/149 |
| | | | | 375/240.26 |
| 2014/0093179 | A1* | 4/2014 | Deshpande | H04N 19/70 |
| | | | | 382/233 |
| 2014/0355692 | A1* | 12/2014 | Ramasubramonian | |
| | | | | H04N 19/597 |
| | | | | 375/240.26 |
| 2015/0103926 | A1* | 4/2015 | Hannuksela | H04N 19/597 |
| | | | | 375/240.26 |
| 2015/0195578 | A1* | 7/2015 | Chen | H04N 19/30 |
| | | | | 375/240.26 |
| 2015/0288976 | A1* | 10/2015 | Hendry | H04N 19/70 |
| | | | | 375/240.12 |
| 2015/0373337 | A1* | 12/2015 | Wang | H04N 19/46 |
| | | | | 375/240.25 |
| 2016/0261878 | A1* | 9/2016 | Deshpande | H04N 19/70 |
| 2017/0150160 | A1* | 5/2017 | Deshpande | H04N 19/30 |
| 2018/0249167 | A1* | 8/2018 | Deshpande | H04N 21/47 |
| 2019/0349549 | A1* | 11/2019 | Weaver | H04N 13/167 |
| 2020/0162767 | A1* | 5/2020 | Deshpande | H04N 21/84 |

OTHER PUBLICATIONS

"MV-HEVC Draft Text 5" (Joint Collaborative Team on 3D Video Coding Extension Development of ITU-T SG16 WP3 and ISO/IEC JTC 1/SC 29/WG 11 Document JCT3V-E1004-v6 5th Meeting Vienna, AU, Aug. 2, 2013; 65 pages (Year: 2013).*

Deshpande, "Video Bitstream Encoding and Decoding with Restrictions on Signaling to Improve Viewer Experience", U.S. Appl. No. 15/118,153, filed Aug. 11, 2016.

Hannuksela, M. et al.; "Test Model for Scalable Extensions of High Efficiency Video Coding (SHVC)"; Joint Collaborative Team on Video Coding (JCT-VC) of ITU-T SG 16 WP 3 and ISO/IEC JTC 1/SC 29/WG 11; Document: JCTVC-L0453; Jan. 14-23, 2013; pp. 1-2.

Chen, J. et al; "SHVC Draft Text 1"; Joint Collaborative Team on Video Coding (JCT-VC) of ITU-T SG16 WP 3 and ISO/IEC JTC/SC 29/WG11; Document: JCTVC-L1008; Jan. 14-23, 2013; 33 pages.

Chen, J. et al.; "High efficiency video coding (HEVC) scalable extension draft 3"; Joint Collaborative Team on Video Coding (JCT-VC) of ITU-T SG 16 WP 3 and ISO/IEC JTC 1/SC 29/WG 11; Document: JCTVC-N1008_v3; Jul. 25-Aug. 2, 2013; 67 pages.

Chen, Y. et al.; "MV-HEVC/SHVC HLS: Cross-layer POC alignment"; Joint Collaborative Team on Video Coding (JCT-VC) of ITU-T SG 16 WP 3 and ISO/IEC JTC 1/SC 29/WG 11; Document: JCTVC-N0244; Jul. 25-Aug. 2, 2013; pp. 1-4.

Hannuksela, M. et al.; "Common specification text for scalable and multi-view extensions (revision of JCTVC-L0188 straw-man text)"; Joint Collaborative Team on Video Coding (JCT-VC)/Joint Collaborative Team on 3D Video Coding Extension Development of ITU-T SG 16 WP 3 and ISO/IEC JTC 1/SC 29/WG 11; Document: JCTVC-L0452r1; Jan. 14-23, 2013; pp. 1-2.

Tech, G. et al.; "MV-HEVC Draft Text 3 (ISO/IEC 23008-2:201x/PDAM2)"; Joint Collaborative Team on 3D Video Coding Extension Development of ITU-T SG 16 WP 3 and ISO/IEC JTC 1/SC 29/WG 11; Document: JCT3V-C1004_d3; Jan. 17-23, 2013; 33 pages.

Tech, G. et al.; "MV-HEVC Draft Text 5"; Joint Collaborative Team on 3D Video Coding Extension Development of ITU-T SG 16 WP 3 and ISO/IEC JTC 1/SC 29/WG 11; Document: JCT3V-E1004-v6; Jul. 27-Aug. 2, 2013; 65 pages.

Hannuksela, M. et al.; "Draft Text for Multiview Extension of High Efficiency Video Coding (HEVC)"; Joint Collaborative Team on Video Coding (JCT-VC) of ITU-T SG 16 WP 3 and ISO/IEC JTC 1/SC29/WG11; Document: JCWC-L0452-spec-text-r1; Oct. 10-19, 2012; pp. 33 pages.

Bross, B. et al.; "High efficiency video coding (HEVC) text specification draft 10 (for FDIS & Consent)"; Joint Collaborative Team on Video Coding (JCT-VC) of ITU-T SG 16 WP 3 and ISO/IEC JTC 1/SC 29/WG 11; Document: JCTVC-L1003_v15; Jan. 14-23, 2013; 335 pages.

Chen, J. et al; "SHVC Working Draft 2"; Joint Collaborative Team on Video Coding (JCT-VC) of ITU-T SG 16 WP 3 and ISO/IEC JTC1/SC29/WG11; Document: JCTVC-M1008_v1; Apr. 18-26, 2013; 53 pages.

Tech, G. et al.; "MV-HEVC Draft Text 4"; Joint Collaborative Team on 3D Video Coding Extension Development of ITU-T SG 16 WP 3 and ISO/IEC JTC 1/SC 29/WG 11; Document: JCT3V-D1004_v4; Apr. 20-26, 2013; 62 pages.

Tech, G. et al.; "MV-HEVC Draft Text 7"; Joint Collaborative Team on 3D Video Coding Extension Development of ITU-T SG 16 WP 3 and ISO/IEC JTC 1/SC 29/WG 11; Document: JCT3V-G1004-v7; Jan. 11-17, 2014; 131 pages.

Chen, J. et al.; "High efficiency video coding (HEVC) scalable extension draft 5"; Joint Collaborative Team on Video Coding (JCT-VC) of ITU-T SG 16 WP 3 and ISO/IEC JTC 1/SC 29/WG 11; Document: JCTVC-P1008_v4; Jan. 9-17, 2014; 125 pages.

* cited by examiner

| nal_unit_header( ) { | Descriptor |
|---|---|
| forbidden_zero_bit | f(1) |
| nal_unit_type | u(6) |
| nuh_reserved_zero_6bits | u(6) |
| nuh_temporal_id_plus1 | u(3) |
| } | |

NAL UNIT HEADER SYNTAX

FIG. 8A

| nal_unit_header( ) { | Descriptor |
|---|---|
| forbidden_zero_bit | f(1) |
| nal_unit_type | u(6) |
| layer_id_plus1 | u(6) |
| nuh_temporal_id_plus1 | u(3) |
| } | |

NAL UNIT HEADER SYNTAX

FIG. 8B

| nal_unit_header( ) { | Descriptor |
|---|---|
| forbidden_zero_bit | f(1) |
| nal_unit_type | u(6) |
| layer_id | u(6) |
| nuh_temporal_id_plus1 | u(3) |
| } | |

NAL UNIT HEADER SYNTAX

FIG. 8C

| nal_unit( NumBytesInNALunit ) { | Descriptor |
|---|---|
| nal_unit_header( ) | |
| NumBytesInRBSP = 0 | |
| for( i = 2; i < NumBytesInNALunit; i++ ) { | |
| if( i + 2 < NumBytesInNALunit && next_bits( 24 ) == 0x000003 ) { | |
| rbsp_byte[ NumBytesInRBSP++ ] | b(8) |
| rbsp_byte[ NumBytesInRBSP++ ] | b(8) |
| i += 2 | |
| emulation_prevention_three_byte /* equal to 0x03 */ | f(8) |
| } else | |
| rbsp_byte[ NumBytesInRBSP++ ] | b(8) |
| } | |
| } | |

GENERAL NAL UNIT SYNTAX

FIG. 9

| vps_extension( ) { | Descriptor |
|---|---|
| while( !byte_aligned( ) ) | |
| vps_extension_byte_alignment_reserved_zero_bit | u(1) |
| // scalability type and layer_id partitioning method | |
| scalability_type | u(4) |
| for( i = 0; i < MaxDim( scalability_type ); i++ ) | |
| layer_id_dim_len[ i ] | u(3) |
| // layer specific information | |
| for( i = 0; i <= max_num_layers_minus1; i++ ) { | |
| vps_layer_id[ i ] | u(6) |
| // layer dependency | |
| num_direct_ref_layers[ i ] | u(6) |
| for( j = 0; j < num_direct_ref_layers[ i ]; j++ ) | |
| ref_layer_id[ i ][ j ] | u(6) |
| } | |
| } | |

EXISTING VIDEO PARAMETER SET EXTENSION SYNTAX

FIG. 10

| scalability_type | MaxDim(scalability_type) | Scalability dimensions |
| --- | --- | --- |
| 0 | 1 | none (base HEVC) |
| 1 | 2 | spatial and quality |
| 2 | 3 | spatial, quality, unspecified |
| 3 | 4 | spatial, quality, unspecified, unspecified |
| 4 | 2 | multiview and depth |
| 5 | 3 | multiview, depth, unspecified |
| 6 | 4 | multiview, depth, unspecified, unspecified |
| 7 | 4 | multiview, spatial, quality and depth |
| 8 | 5 | multiview, spatial, quality, depth, unspecified |
| 9 | 6 | multiview, spatial, quality, depth, unspecified, unspecified |
| 10...15 | reserved | reserved |

EXISTING MEDIA TYPES

FIG. 11

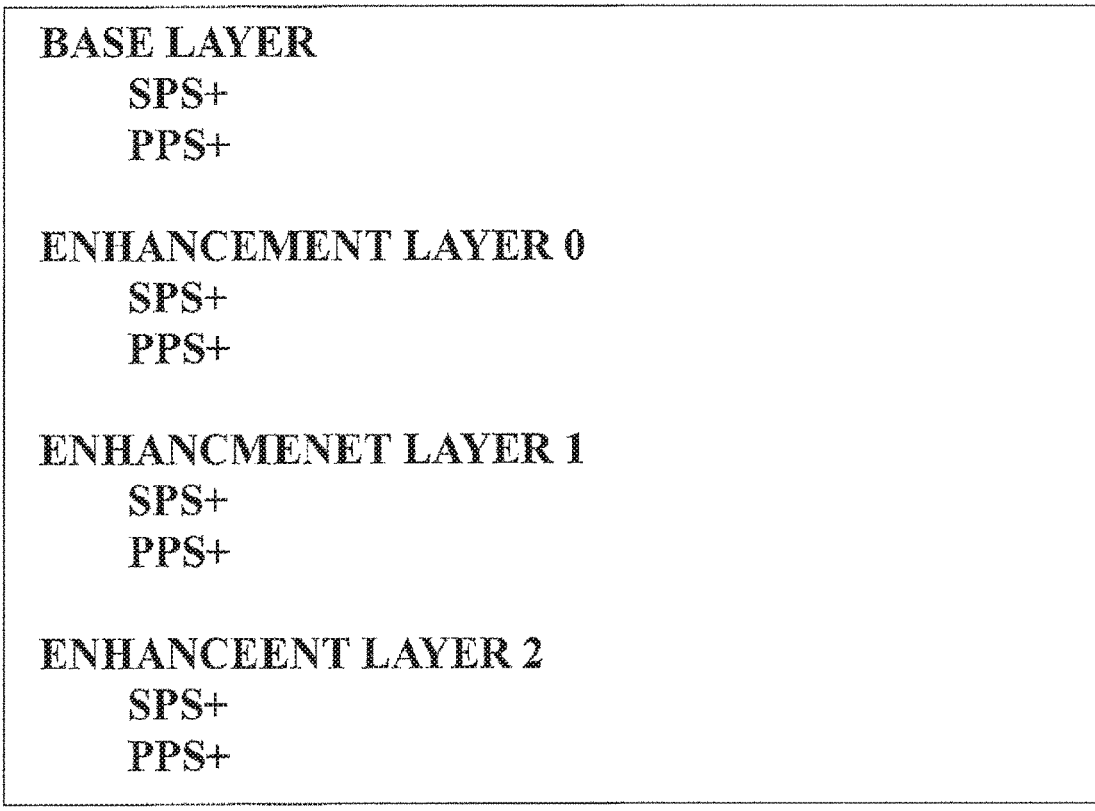

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     if (num_extra_slice_header_bits>0) | |
|       discardable_flag | u(1) |
|     for( i=1; i < num_extra_slice_header_bits; i++ ) | |
|       slice_reserved_flag[ i ] | u(1) |
|     slice_type | ue(1) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |

FIG. 18A

| | |
|---|---|
|     } | |
|   } | |
|     if( sps_temporal_mvp_enabled_flag ) | |
|         slice_temporal_mvp_enabled_flag | u(1) |
| } | |
| if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|         if( !max_one_active_ref_layer_flag ) | |
|             num_inter_layer_ref_pics_minus1 | u(v) |
|         for( i = 0; i < NumActiveRefLayerPics; i++ ) | |
|             inter_layer_pred_layer_idc[ i ] | u(v) |
|     } | |
| } | |
| if( NumSamplePredRefLayers[ nuh_layer_id ]>0 && NumActiveRefLayersPics>0 ) | |
|     inter_layer_sample_pred_only_flag | |
| if( sample_adaptive_offset_enabled_flag ) { | |
|     slice_sao_luma_flag | u(1) |
|     slice_sao_chroma_flag | u(1) |
| } | |
| if( slice_type == P || slice_type == B ) { | |
|     num_ref_idx_active_override_flag | u(1) |
|     if( num_ref_idx_active_override_flag ) { | |
|         num_ref_idx_l0_active_minus1 | ue(v) |
|         if( slice_type == B ) | |
|             num_ref_idx_l1_active_minus1 | ue(v) |
|     } | |
|     if( lists_modification_present_flag && NumPicTotalCurr > 1 ) | |
|         ref_pic_lists_modification( ) | |
|     if( slice_type == B ) | |
|         mvd_l1_zero_flag | u(1) |
|     if( cabac_init_present_flag ) | |
|         cabac_init_flag | u(1) |
|     if( slice_temporal_mvp_enabled_flag ) { | |
|         if(nuh_layer_id>0 && NumActiveMotionPredRefLayers>0) | |
|             alt_collocated_indication_flag | u(1) |
|         if( alt_collocated_indication_flag) | |

FIG. 18B

| | |
|---|---|
| if( NumActiveMotionPredRefLayers>1) ) | |
|   collocated_ref_layer_idx | ue(v) |
| else{ | |
|   if( slice_type == B ) | |
|     collocated_from_l0_flag | u(1) |
|   if( ( collocated_from_l0_flag && num_ref_idx_l0_active_minus1 > 0 ) \|\|<br>    ( !collocated_from_l0_flag && num_ref_idx_l1_active_minus1 > 0 ) ) | |
|     collocated_ref_idx | ue(v) |
|   } | |
| } | |
| if( ( weighted_pred_flag && slice_type == P ) \|\|<br>  ( weighted_bipred_flag && slice_type == B ) ) | |
|   pred_weight_table( ) | |
|   five_minus_max_num_merge_cand | ue(v) |
| } | |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( pps_loop_filter_across_slices_enabled_flag &&<br>  ( slice_sao_luma_flag \|\| slice_sao_chroma_flag \|\|<br>  !slice_deblocking_filter_disabled_flag ) ) | |
|   slice_loop_filter_across_slices_enabled_flag | u(1) |
| } | |
| if( tiles_enabled_flag \|\| entropy_coding_sync_enabled_flag ) { | |
|   num_entry_point_offsets | ue(v) |
|   if( num_entry_point_offsets > 0 ) { | |
|     offset_len_minus1 | ue(v) |
|     for( i = 0; i < num_entry_point_offsets; i++ ) | |
|       entry_point_offset_minus1[ i ] | u(v) |
|   } | |

FIG. 18C

| | |
|---|---|
| } | |
| if( slice_segment_header_extension_present_flag ) { | |
|    slice_segment_header_extension_length | ue(v) |
|    for( i=0;i<slice_segment_header_extension_length; i++ ) | |
|      slice_segment_header_extension_data_byte[ i ] | u(8) |
| } | |
| byte_alignment( ) | |
| } | |

| | |
|---|---|
| vps_extension( ) { | Descriptor |
| avc_base_layer_flag | u(1) |
| vps_vui_offset | u(16) |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes - splitting_flag ); j++ ) | |
|     dimension_id_len_minus1[ j ] | u(3) |
| vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
| If( NumViews>1) | |
|   view_id_len_minus1 | u(4) |
|   for( i = 0; i < NumViews; i++ ) | |
|     view_id_val[ i ] | u(v) |
|   for( i = 1; i <= vps_max_layers_minus1; i++ ) | |
|     for( j = 0; j < i; j++ ) | |
|       direct_dependency_flag[ i ][ j ] | u(1) |
| max_tid_ref_present_flag | u(1) |
| if( max_tid_ref_present_flag ) | |
|   for( i = 0; i < vps_max_layers_minu1; i++ ) | |
|     max_tid_il_ref_pics_plus1[ i ] | u(3) |
| all_ref_layers_active_flag | u(1) |
| vps_number_layer_sets_minus1 | u(10) |
| vps_num_profile_tier_level_minus1 | u(6) |
| for( i=1; i <= vps_num_profile_tier_level_minus1; i ++ ) { | |
|   vps_profile_present_flag[ i ] | u(1) |
|   if (!vps_profile_present_flag[ i ] ) | |
|     profile_ref_minus1[ i ] | u(6) |
|   profile_tier_level( vps_profile_present_flag[ i ], vps_max_sub_ayers_minus1 ) | |
| } | ue(v) |

FIG. 20A

| | |
|---|---|
| numOutputLayerSets = vps_number_layer_sets_minu1 + 1 | |
| more_output_layer_sets_than_default_flag | u(1) |
| if( more_output_layer_sets_than_default_flag ){ | |
| num_add_output_layer_sets_minu1 | u(10) |
| numOutputLayerSets + num_add_output_layer_sets_minu1 + 1 | |
| } | |
| if( numOutputLayerSets > 1 ) | |
| defaut_one_target_output_layer_flag | u(1) |
| for( i = 1; i < NumOutputLayerSets; i++ ) { | |
| if( i > vps_number_layer_sets_minus1 ){ | |
| output_layer_set_idx_minu1[ i ] | u(v) |
| IsIdx = output_layer_set_idx_minus1[ i ] | |
| for( j = 0; j < NumLayersInIdList[ IsIdx ] -1; j++) | |
| output_layer_flag[ i ][ j ] | u(1) |
| } | |
| profile_level_tier_idx[ i ] | u(v) |
| } | |
| rep_format_idx_present_flag | u(1) |
| if( rep_format_idx_present_flag) | |
| vps_num_rep_formats_minu1 | u(4) |
| for( i = 0; i <= vps_num_rep_formats_minus1; i++ ) | |
| rep_format( ) | |
| if( rep_format_idx_present_flag) | u(1) |
| for( i=1; i <= vps_max_layers_minu1; i++) | |
| if( vps_num_rep_formats_minus1 >0) | |
| vps_rep_format_idx[ i ] | u(4) |
| max_one_active_ref_layer_flag | u(1) |
| cross_layer_irap_aligned_flag | u(1) |
| direct_dep_type_len_minus2 | ue(v) |
| for( i = 1; i <= vps_max_layers_minu1; i++ ) | |
| for( j = 0; j < i; j++ ) | |
| if( direct_dependency_flag[ i ][ j ] ) | |
| direct_dependency_type[ i ][ j ] | u(v) |
| single_layer_for_non_irap_flag | u(1) |
| vps_vui_present_flag | u(1) |
| if( vps_vui_present_flag ) { | |
| while( !byte_aligned( ) ) | |
| vps_vui_alignment_bit_equal_to_one | u(1) |
| vps_vui( ) | |
| } | |
| } | |

FIG. 20B

| rep_format( ) { | Descriptor |
|---|---|
|    chroma_format_vps_idc | u(2) |
|    if( chroma_format_vps_idc == 3 ) | |
|       separate_colour_plane_vps_flag | u(1) |
|    pic_width_vps_in_luma_samples | u(16) |
|    pic_height_vps_in_luma_samples | u(16) |
|    bit_depth_vps_luma_minus8 | u(4) |
|    bit_depth_vps_chroma_minus8 | u(4) |
| } | |

FIG. 21

| vps_vui( ) { | Descriptor |
|---|---|
|   bit_rate_present_vps_flag | u(1) |
|   pic_rate_present_vps_flag | u(1) |
|   if( bit_rate_present_vps_flag \|\| pic_rate_present_vps_flag ) | |
|     for( i = 0; i <= vps_num_layer_sets_minus1; i++ ) | |
|       for( j = 0; j <= vps_max_sub_layers_minus1[ i ]; j++ ) { | |
|         if( bit_rate_present_vps_flag ) | |
|           bit_rate_present_flag[ i ][ j ] | u(1) |
|         if( pic_rate_present_vps_flag ) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
|   for( i = 1; i <= vps_max_layers_minu1; i++ ) | |
|     for( j = 0; j < NumDirectRefLayers[ layer_id_in_nuh[ i ] ]; j++ ) { | |
|       tile_boundaries_aligned_flag[ i ][ j ] | u(1) |
|   ilp_restricted_ref_layers_flag | u(1) |
|   if( ilp_restricted_ref_layers_flag ) | |
|     for( i = 1; i <= vps_max_layers_minus1; i++ ) | |
|       for( j = 0; j < NumDirectRefLayers[ layer_id_in_nuh[ i ] ]; j++ ) | |
|         min_spatial_segment_offset_plus1[ i ][ j ] | ue(v) |
|         if( min_spatial_segment_offset_plus1[ i ][ j ] > 0 ) { | |
|           ctu_based_offset_enabled_flag[ i ][ j ] | u(1) |
|           if( ctu_based_offset_enabled_flag[ i ][ j ] ) | |
|             min_horizontal_ctu_offset_plus1[ i ][ j ] | ue(v) |
|         } | |
|     } | |
| } | |

FIG. 22

| vps_vui( ) { | Descriptor |
|---|---|
|   bit_rate_present_vps_flag | u(1) |
|   pic_rate_present_vps_flag | u(1) |
|   if( bit_rate_present_vps_flag \|\| pic_rate_present_vps_flag ) | |
|     for( i = 0; i <= vps_num_layer_sets_minus1; i++ ) | |
|       for( j = 0; j <= vps_max_sub_layers_minus1[ i ]; j++ ) { | |
|         if( bit_rate_present_vps_flag ) | |
|           bit_rate_present_flag[ i ][ j ] | u(1) |
|         if( pic_rate_present_vps_flag ) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
|   for( i = 1; i <= vps_max_layers_minu1; i++ ) | |
|     for( j = 0; j < NumDirectRefLayers[ layer_id_in_nuh[ i ] ]; j++ ) { | |
|       tile_boundaries_aligned_flag[ i ][ j ] | u(1) |
|   ilp_restricted_ref_layers_flag | u(1) |
|   if( ilp_restricted_ref_layers_flag ) | |
|     for( i = 1; i <= vps_max_layers_minus1; i++ ) | |
|       common_ilp_offset_params_present_flag[ i ] | |
|       for( j = 0; j < (common_ilp_offset_params_present_flag[ i ] ? 1: NumDirectRefLayers[ layer_id_in_nuh[ i ] ]); j++ ){ | |
|         min_spatial_segment_offset_plus1[ i ][ j ] | ue(v) |
|         if( min_spatial_segment_offset_plus1[ i ][ j ] > 0 ) { | |
|           ctu_based_offset_enabled_flag[ i ][ j ] | u(1) |
|           if( ctu_based_offset_enabled_flag[ i ][ j ] ) | |
|             min_horizontal_ctu_offset_plus1[ i ][ j ] | ue(v) |
|         } | |
|       } | |
| } | |

FIG. 23

| | Descriptor |
|---|---|
| video_parameter_set_rbsp( ) { | |
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_reserved_0xffff_16bits | u(16) |
|   profile_tier_level( vps_max_sub_layers_minus1 ) | |
|   vps_sub_layer_ordering_info_present_flag | u(1) |
|   for( i = ( vps_sub_layer_ordering_info_present_flag ? 0 : vps_max_sub_layers_minus1 );<br>     i <= vps_max_sub_layers_minus1; i++ ) { | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_max_layer_id | u(6) |
|   vps_num_layer_sets_minus1 | ue(v) |
|   for( i = 1; i <= vps_num_layer_sets_minus1; i++ ) | |
|     for( j = 0; j <= vps_max_layer_id; j++ ) | |
|       layer_id_included_flag[ i ][ j ] | u(1) |
|   vps_timing_info_present_flag | u(1) |
|   if( vps_timing_info_present_flag ) { | |
|     vps_num_units_in_tick | u(32) |
|     vps_time_scale | u(32) |
|     vps_poc_proportional_to_timing_flag | u(1) |
|     if( vps_poc_proportional_to_timing_flag ) | |
|       vps_num_ticks_poc_diff_one_minus1 | ue(v) |
|     vps_num_hrd_parameters | ue(v) |
|     for( i = 0; i < vps_num_hrd_parameters; i++ ) { | |
|       hrd_layer_set_idx[ i ] | ue(v) |
|       if( i > 0 ) | |
|         cprms_present_flag[ i ] | u(1) |
|       hrd_parameters( cprms_present_flag[ i ], vps_max_sub_layers_minus1 ) | |
|     } | |
|   } | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

FIG. 24A

| | Descriptor |
|---|---|
| video_parameter_set_rbsp( ) { | |
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_reserved_0xffff_16bits | u(16) |
|   profile_tier_level( 1, vps_max_sub_layers_minus1 ) | |
|   vps_sub_layer_ordering_info_present_flag | u(1) |
|   for( i = ( vps_sub_layer_ordering_info_present_flag ? 0 : vps_max_sub_layers_minus1 );<br>     i <= vps_max_sub_layers_minus1; i++ ) { | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_max_layer_id | u(6) |
|   vps_num_layer_sets_minus1 | ue(v) |
|   for( i = 1; i <= vps_num_layer_sets_minus1; i++ ) | |
|     for( j = 0; j <= vps_max_layer_id; j++ ) | |
|       layer_id_included_flag[ i ][ j ] | u(1) |
|   vps_timing_info_present_flag | u(1) |
|   if( vps_timing_info_present_flag ) { | |
|     vps_num_units_in_tick | u(32) |
|     vps_time_scale | u(32) |
|     vps_poc_proportional_to_timing_flag | u(1) |
|     if( vps_poc_proportional_to_timing_flag ) | |
|       vps_num_ticks_poc_diff_one_minus1 | ue(v) |
|     vps_num_hrd_parameters | ue(v) |
|     for( i = 0; i < vps_num_hrd_parameters; i++ ) { | |
|       hrd_layer_set_idx[ i ] | ue(v) |
|       if( i > 0 ) | |
|         cprms_present_flag[ i ] | u(1) |
|       hrd_parameters( cprms_present_flag[ i ], vps_max_sub_layers_minus1 ) | |
|     } | |
|   } | |
|   vps_extension_flag | u(1) |
|   if( vps_extension_flag ) { | |
|     while( !byte_aligned( ) ) | |
|       vps_extension_alignment_bit_equal_to_one | u(1) |

FIG. 24B

| | |
|---|---|
| vps_extension( ) | |
| vps_extension2_flag | u(1) |
| if( vps_extension2_flag ) | |
|     while( more_rbsp_data( ) ) | |
|         vps_extension_data_flag | u(1) |
| } | |
| rbsp_trailing_bits( ) | |
| } | |

FIG. 24B (continued)

| vps_extension( ) { | Descriptor |
|---|---|
|   avc_base_layer_flag | u(1) |
|   splitting_flag | u(1) |
|   for( i = 0, NumScalabilityTypes = 0; i < 16; i++ ) { | |
|     scalability_mask_flag[ i ] | u(1) |
|     NumScalabilityTypes += scalability_mask_flag[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= MaxLayersMinus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   view_id_len | u(4) |
|   if( view_id_len > 0 ) | |
|     for( i = 0; i < NumViews; i++ ) | |
|       view_id_val[ i ] | u(v) |
|   for( i = 1; i <= MaxLayersMinus1; i++ ) | |
|     for( j = 0; j < i; j++ ) | |
|       direct_dependency_flag[ i ][ j ] | u(1) |
|   vps_sub_layers_max_minus1_present_flag | u(1) |
|   if( vps_sub_layers_max_minus1_present_flag ) | |
|     for( i = 0; i <= MaxLayersMinus1; i++ ) | |
|       sub_layers_vps_max_minus1[ i ] | u(3) |
|   max_tid_ref_present_flag | u(1) |
|   if( max_tid_ref_present_flag ) | |
|     for( i = 0; i < MaxLayersMinus1; i++ ) | |
|       for( j = i + 1; j <= MaxLayersMinus1; j++ ) | |
|         if( direct_dependency_flag[ j ][ i ] ) | |
|           max_tid_il_ref_pics_plus1[ i ][ j ] | u(3) |
|   all_ref_layers_active_flag | u(1) |
|   vps_num_profile_tier_level_minus1 | ue(v) |
|   for( ptlIdx = 1; ptlIdx <= vps_num_profile_tier_level_minus1; ptlIdx ++ ) { | |
|     vps_profile_present_flag[ ptlIdx ] | u(1) |
|     profile_tier_level( vps_profile_present_flag[ ptlIdx ], vps_max_sub_layers_minus1 ) | |
|   } | |
|   num_add_output_layer_sets | ue(v) |
|   NumOutputLayerSets = num_add_output_layer_sets + vps_num_layer_sets_minus1 + 1 | |
|   if( NumOutputLayerSets > 1 ) | |

FIG. 25

| | | |
|---|---|---|
| | default_target_output_layer_idc | u(2) |
| | for( i = 1; i < NumOutputLayerSets; i++ ) { | |
| |   if( i > vps_num_layer_sets_minus1 ) | |
| |     output_layer_set_idx_minus1[ i ] | u(v) |
| |   if( i > vps_num_layer_sets_minus1 \|\| default_target_output_layer_idc = = 2 ) | |
| |     for( j = 0; j < NumLayersInIdList[ LayerSetIdxForOutputLayerSet[ i ] ]; j++ ) | |
| |       output_layer_flag[ i ][ j ] | u(1) |
| |   profile_level_tier_idx[ i ] | u(v) |
| |   if( NumOutputLayersInOutputLayerSet[ i ] = = 1 && NumDirectRefLayers[ OlsHighestOutputLayerId[ i ] ] > 0 ) | |
| |     alt_output_layer_flag[ i ] | u(1) |
| | } | |
| | rep_format_idx_present_flag | u(1) |
| | if( rep_format_idx_present_flag ) | |
| |   vps_num_rep_formats_minus1 | ue(v) |
| | for( i = 0; i <= vps_num_rep_formats_minus1; i++ ) | |
| |   rep_format( ) | |
| | if( rep_format_idx_present_flag ) | |
| |   for( i = 1; i <= MaxLayersMinus1; i++ ) | |
| |     if( vps_num_rep_formats_minus1 > 0 ) | |
| |       vps_rep_format_idx[ i ] | u(v) |
| | max_one_active_ref_layer_flag | u(1) |
| | vps_poc_lsb_aligned_flag | u(1) |
| | for( i = 1; i <= MaxLayersMinus1; i++ ) | |
| |   if( NumDirectRefLayers[ layer_id_in_nuh[ i ] ] = = 0 ) | |
| |     poc_lsb_not_present_flag[ i ] | u(1) |
| | cross_layer_phase_alignment_flag | u(1) |
| | dpb_size( ) | |
| | direct_dep_type_len_minus2 | ue(v) |
| | default_direct_dependency_flag | u(1) |
| | if( default_direct_dependency_flag ) | |
| |   default_direct_dependency_type | u(v) |
| | else { | |
| |   for( i = 1; i <= MaxLayersMinus1; i++ ) | |
| |     for( j = 0; j < i; j++ ) | |
| |       if( direct_dependency_flag[ i ][ j ] ) | |
| |         direct_dependency_type[ i ][ j ] | u(v) |
| | } | |
| | vps_non_vui_extension_length | ue(v) |
| | for( i = 1; i <= vps_non_vui_extension_length; i++ ) | |
| |   vps_non_vui_extension_data_byte | u(8) |
| | vps_vui_present_flag | |
| | if( vps_vui_present_flag ) { | |

FIG. 25 (continued)

| | |
|---|---|
| while( !byte_aligned( ) ) | |
|    vps_vui_alignment_bit_equal_to_one | u(1) |
| vps_vui( ) | |
| } | |
| } | |

FIG. 25 (continued)

| | Descriptor |
|---|---|
| vps_vui( ){ | |
|   cross_layer_pic_type_aligned_flag | u(1) |
|   if( !cross_layer_pic_type_aligned_flag ) | |
|     cross_layer_irap_aligned_flag | u(1) |
|   if( cross_layer_irap_aligned_flag ) | |
|     all_layers_idr_aligned_flag | u(1) |
|   bit_rate_present_vps_flag | u(1) |
|   pic_rate_present_vps_flag | u(1) |
|   if( bit_rate_present_vps_flag \|\| pic_rate_present_vps_flag ) | |
|     for( i = 0; i <= vps_number_layer_sets_minus1; i++ ) | |
|       for( j = 0; j <= vps_max_sub_layers_minus1; j++ ) { | |
|         if( bit_rate_present_vps_flag ) | |
|           bit_rate_present_flag[ i ][ j ] | u(1) |
|         if( pic_rate_present_vps_flag ) | |
|           pic_rate_present_flag[ i ][ j ] | u(1) |
|         if( bit_rate_present_flag[ i ][ j ] ) { | |
|           avg_bit_rate[ i ][ j ] | u(16) |
|           max_bit_rate[ i ][ j ] | u(16) |
|         } | |
|         if( pic_rate_present_flag[ i ][ j ] ) { | |
|           constant_pic_rate_idc[ i ][ j ] | u(2) |
|           avg_pic_rate[ i ][ j ] | u(16) |
|         } | |
|       } | |
|   video_signal_info_idx_present_flag | u(1) |
|   if( video_signal_info_idx_present_flag ) | |
|     vps_num_video_signal_info_minus1 | u(4) |
|   for( i = 0; i <= vps_num_video_signal_info_minus1; i++ ) | |
|     video_signal_info( ) | |
|   if( video_signal_info_idx_present_flag && vps_num_video_signal_info_minus1 > 0 ) | |
|     for( i = 1; i <= MaxLayersMinus1; i++ ) | |
|       vps_video_signal_info_idx[ i ] | u(4) |
|   tiles_not_in_use_flag | u(1) |
|   if( !tiles_not_in_use_flag ) { | |
|     for( i = 0; i <= MaxLayersMinus1; i++ ) { | |
|       tiles_in_use_flag[ i ] | u(1) |
|       if( tiles_in_use_flag[ i ] ) | |
|         loop_filter_not_across_tiles_flag[ i ] | u(1) |
|     } | |
|     for( i = 1; i <= MaxLayersMinus1; i++ ) | |
|       for( j = 0; j < NumDirectRefLayers[ layer_id_in_nuh[ i ] ]; j++ ) { | |
|         layerIdx = LayerIdxInVps[ RefLayerId[ layer_id_in_nuh[ i ] ][ j ] ] | |
|         if( tiles_in_use_flag[ i ] && tiles_in_use_flag[ layerIdx ] ) | |

FIG. 26

| | |
|---|---|
| tile_boundaries_aligned_flag[ i ][ j ] | u(1) |
| } | |
| } | |
| wpp_not_in_use_flag | u(1) |
| if( !wpp_not_in_use_flag ) | |
|   for( i = 0; i <= MaxLayersMinus1; i++ ) | |
|     wpp_in_use_flag[ i ] | u(1) |
| single_layer_for_non_irap_flag | u(1) |
| higher_layer_irap_skip_flag | u(1) |
| vert_phase_position_in_use_flag | u(1) |
| ilp_restricted_ref_layers_flag | u(1) |
| if( ilp_restricted_ref_layers_flag ) | |
|   for( i = 1; i <= MaxLayersMinus1; i++ ) | |
|     for( j = 0; j < NumDirectRefLayers[ layer_id_in_nuh[ i ] ]; j++ ) { | |
|       min_spatial_segment_offset_plus1[ i ][ j ] | ue(v) |
|       if( min_spatial_segment_offset_plus1[ i ][ j ] > 0 ) { | |
|         ctu_based_offset_enabled_flag[ i ][ j ] | u(1) |
|         if( ctu_based_offset_enabled_flag[ i ][ j ] ) | |
|           min_horizontal_ctu_offset_plus1[ i ][ j ] | ue(v) |
|       } | |
|     } | |
| vps_vui_bsp_hrd_present_flag | u(1) |
| if( vps_vui_bsp_hrd_present_flag ) | |
|   vps_vui_bsp_hrd_parameters( ) | |
| for( i = 1; i <= MaxLayersMinus1; i++ ) | |
|   if( NumDirectRefLayers[ layer_id_in_nuh[ i ] ] == 0 ) | |
|     base_layer_parameter_set_compatibility_flag[ i ] | u(1) |
| } | |

FIG. 26 (continued)

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( sps_max_sub_layers_minus1 ) | |
|   sps_seq_parameter_set_id | ue(v) |
|   chroma_format_idc | ue(v) |
|   if( chroma_format_idc == 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 );<br>    i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   log2_min_luma_coding_block_size_minus3 | ue(v) |
|   log2_diff_max_min_luma_coding_block_size | ue(v) |
|   log2_min_luma_transform_block_size_minus2 | ue(v) |
|   log2_diff_max_min_luma_transform_block_size | ue(v) |
|   max_transform_hierarchy_depth_inter | ue(v) |
|   max_transform_hierarchy_depth_intra | ue(v) |
|   scaling_list_enabled_flag | u(1) |
|   if( scaling_list_enabled_flag ) { | |
|     sps_scaling_list_data_present_flag | u(1) |
|     if( sps_scaling_list_data_present_flag ) | |
|       scaling_list_data( ) | |
|   } | |
|   amp_enabled_flag | u(1) |
|   sample_adaptive_offset_enabled_flag | u(1) |
|   pcm_enabled_flag | u(1) |

FIG. 27

| | |
|---|---|
| if( pcm_enabled_flag ) { | |
|    pcm_sample_bit_depth_luma_minus1 | u(4) |
|    pcm_sample_bit_depth_chroma_minus1 | u(4) |
|    log2_min_pcm_luma_coding_block_size_minus3 | ue(v) |
|    log2_diff_max_min_pcm_luma_coding_block_size | ue(v) |
|    pcm_loop_filter_disabled_flag | u(1) |
| } | |
| num_short_term_ref_pic_sets | ue(v) |
| for( i = 0; i < num_short_term_ref_pic_sets; i++) | |
|    st_ref_pic_set( i ) | |
| long_term_ref_pics_present_flag | u(1) |
| if( long_term_ref_pics_present_flag ) { | |
|    num_long_term_ref_pics_sps | ue(v) |
|    for( i = 0; i < num_long_term_ref_pics_sps; i++ ) { | |
|       lt_ref_pic_poc_lsb_sps[ i ] | u(v) |
|       used_by_curr_pic_lt_sps_flag[ i ] | u(1) |
|    } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
|    vui_parameters( ) | |
| sps_extension_flag | u(1) |
| if( sps_extension_flag ) | |
|    while( more_rbsp_data( ) ) | |
|       sps_extension_data_flag | u(1) |
| rbsp_trailing_bits( ) | |
| } | |

FIG. 27 (continued)

| vui_parameters( ) { | Descriptor |
|---|---|
|   aspect_ratio_info_present_flag | u(1) |
|   if( aspect_ratio_info_present_flag ) { | |
|     aspect_ratio_idc | u(8) |
|     if( aspect_ratio_idc == EXTENDED_SAR ) { | |
|       sar_width | u(16) |
|       sar_height | u(16) |
|     } | |
|   } | |
|   overscan_info_present_flag | u(1) |
|   if( overscan_info_present_flag ) | |
|     overscan_appropriate_flag | u(1) |
|   video_signal_type_present_flag | u(1) |
|   if( video_signal_type_present_flag ) { | |
|     video_format | u(3) |
|     video_full_range_flag | u(1) |
|     colour_description_present_flag | u(1) |
|     if( colour_description_present_flag ) { | |
|       colour_primaries | u(8) |
|       transfer_characteristics | u(8) |
|       matrix_coeffs | u(8) |
|     } | |
|   } | |
|   chroma_loc_info_present_flag | u(1) |
|   if( chroma_loc_info_present_flag ) { | |
|     chroma_sample_loc_type_top_field | ue(v) |
|     chroma_sample_loc_type_bottom_field | ue(v) |
|   } | |
|   neutral_chroma_indication_flag | u(1) |
|   field_seq_flag | u(1) |
|   frame_field_info_present_flag | u(1) |
|   default_display_window_flag | u(1) |
|   if( default_display_window_flag ) { | |
|     def_disp_win_left_offset | ue(v) |
|     def_disp_win_right_offset | ue(v) |
|     def_disp_win_top_offset | ue(v) |
|     def_disp_win_bottom_offset | ue(v) |
|   } | |
|   vui_timing_info_present_flag | u(1) |
|   if( vui_timing_info_present_flag ) { | |
|     vui_num_units_in_tick | u(32) |
|     vui_time_scale | u(32) |
|     vui_poc_proportional_to_timing_flag | u(1) |

FIG. 28

| | |
|---|---|
| if( vui_poc_proportional_to_timing_flag ) | |
|    vui_num_ticks_poc_diff_one_minus1 | ue(v) |
| vui_hrd_parameters_present_flag | u(1) |
| if( vui_hrd_parameters_present_flag ) | |
|    hrd_parameters( 1, sps_max_sub_layers_minus1 ) | |
| } | |
| bitstream_restriction_flag | u(1) |
| if( bitstream_restriction_flag ) { | |
|    tiles_fixed_structure_flag | u(1) |
|    motion_vectors_over_pic_boundaries_flag | u(1) |
|    restricted_ref_pic_lists_flag | u(1) |
|    min_spatial_segmentation_idc | ue(v) |
|    max_bytes_per_pic_denom | ue(v) |
|    max_bits_per_min_cu_denom | ue(v) |
|    log2_max_mv_length_horizontal | ue(v) |
|    log2_max_mv_length_vertical | ue(v) |
| } | |
| } | |

FIG. 28 (continued)

```
profile_tier_level( maxNumSubLayersMinus1 ) {
    general_profile_space
    general_tier_flag
    general_profile_idc
    for( j = 0; j < 32; j++ )
        general_profile_compatibility_flag[ j ]
    general_progressive_source_flag
    general_interlaced_source_flag
    general_non_packed_constraint_flag
    general_frame_only_constraint_flag
    general_reserved_zero_44bits
    general_level_idc
    for( i = 0; i < maxNumSubLayersMinus1; i++ ) {
        sub_layer_profile_present_flag[ i ]
        sub_layer_level_present_flag[ i ]
    }
    if( maxNumSubLayersMinus1 > 0 )
        for( i = maxNumSubLayersMinus1; i < 8; i++ )
            reserved_zero_2bits[ i ]
    for( i = 0; i < maxNumSubLayersMinus1; i++ ) {
        if( sub_layer_profile_present_flag[ i ] ) {
            sub_layer_profile_space[ i ]
            sub_layer_tier_flag[ i ]
            sub_layer_profile_idc[ i ]
            for( j = 0; j < 32; j++ )
                sub_layer_profile_compatibility_flag[ i ][ j ]
            sub_layer_progressive_source_flag[ i ]
            sub_layer_interlaced_source_flag[ i ]
            sub_layer_non_packed_constraint_flag[ i ]
            sub_layer_frame_only_constraint_flag[ i ]
            sub_layer_reserved_zero_44bits[ i ]
        }
        if( sub_layer_level_present_flag[ i ] )
            sub_layer_level_idc[ i ]
    }
}
```

FIG. 29

| | Descriptor |
|---|---|
| profile_tier_level( profilePresentFlag, maxNumSubLayersMinus1 ) { | |
|   if( profilePresentFlag ) { | |
|     general_profile_space | u(2) |
|     general_tier_flag | u(1) |
|     general_profile_idc | u(5) |
|     for( j = 0; j < 32; j++ ) | |
|       general_profile_compatibility_flag[ j ] | u(1) |
|     general_progressive_source_flag | u(1) |
|     general_interlaced_source_flag | u(1) |
|     general_non_packed_constraint_flag | u(1) |
|     general_frame_only_constraint_flag | u(1) |
|     general_reserved_zero_44bits | u(44) |
|   } | |
|   general_level_idc | u(8) |
|   for( i = 0; i < maxNumSubLayersMinus1; i++ ) { | |
|     sub_layer_profile_present_flag[ i ] | u(1) |
|     sub_layer_level_present_flag[ i ] | u(1) |
|   } | |
|   if( maxNumSubLayersMinus1 > 0 ) | |
|     for( i = maxNumSubLayersMinus1; i < 8; i++ ) | |
|       reserved_zero_2bits[ i ] | u(2) |
|   for( i = 0; i < maxNumSubLayersMinus1; i++ ) { | |
|     if( sub_layer_profile_present_flag[ i ] ) { | |
|       sub_layer_profile_space[ i ] | u(2) |
|       sub_layer_tier_flag[ i ] | u(1) |
|       sub_layer_profile_idc[ i ] | u(5) |
|       for( j = 0; j < 32; j++ ) | |
|         sub_layer_profile_compatibility_flag[ i ][ j ] | u(1) |
|       sub_layer_progressive_source_flag[ i ] | u(1) |
|       sub_layer_interlaced_source_flag[ i ] | u(1) |
|       sub_layer_non_packed_constraint_flag[ i ] | u(1) |
|       sub_layer_frame_only_constraint_flag[ i ] | u(1) |
|       sub_layer_reserved_zero_44bits[ i ] | u(44) |
|     } | |
|     if( sub_layer_level_present_flag[ i ] ) | |
|       sub_layer_level_idc[ i ] | u(8) |
|   } | |
| } | |

FIG. 30

VIDEO BITSTREAM ENCODING AND DECODING WITH RESTRICTIONS ON SIGNALING TO IMPROVE VIEWER EXPERIENCE

TECHNICAL FIELD

The present disclosure relates generally to electronic devices.

BACKGROUND ART

Electronic devices have become smaller and more powerful in order to meet consumer needs and to improve portability and convenience. Consumers have become dependent upon electronic devices and have come to expect increased functionality. Some examples of electronic devices include desktop computers, laptop computers, cellular phones, smart phones, media players, integrated circuits, etc.

Some electronic devices are used for processing and displaying digital media. For example, portable electronic devices now allow for digital media to be consumed at almost any location where a consumer may be. Furthermore, some electronic devices may provide download or streaming of digital media content for the use and enjoyment of a consumer.

The increasing popularity of digital media has presented several problems. For example, efficiently representing high-quality digital media for storage, transmittal and rapid playback presents several challenges. As can be observed from this discussion, systems and methods that represent digital media efficiently with improved performance may be beneficial.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 8A illustrates different NAL Unit header syntax.
FIG. 8B illustrates different NAL Unit header syntax.
FIG. 8C illustrates different NAL Unit header syntax.
FIG. 9 illustrates a general NAL Unit syntax.
FIG. 10 illustrates an existing video parameter set.
FIG. 11 illustrates existing scalability types.
FIG. 12 illustrates a base layer and enhancement layers.
FIG. 16 illustrates a picture with slices.
FIG. 18A illustrates an exemplary slice segment header syntax.
FIG. 18B illustrates an exemplary slice segment header syntax.
FIG. 18C illustrates an exemplary slice segment header syntax.
FIG. 20A illustrates an exemplary video parameter set (VPS) extension syntax.
FIG. 20B illustrates an exemplary video parameter set (VPS) extension syntax.
FIG. 21 illustrates an exemplary representation format syntax
FIG. 22 illustrates an exemplary vps video usability information (VUI) syntax
FIG. 23 illustrates an exemplary vps video usability information (VUI) syntax
FIG. 24A illustrates an exemplary video parameter set (VPS) syntax.
FIG. 24B illustrates an exemplary video parameter set (VPS) syntax.
FIG. 25 illustrates an exemplary vps extension syntax
FIG. 26 illustrates an exemplary vps video usability information (VUI) syntax
FIG. 27 illustrates an exemplary sequence parameter set (SPS) extension syntax
FIG. 28 illustrates an exemplary sps video usability information (SPS VUI)
FIG. 29 illustrates an exemplary profile_tier_level syntax
FIG. 30 illustrates an exemplary profile_tier_level syntax

DESCRIPTION OF EMBODIMENTS

Figure 1A:
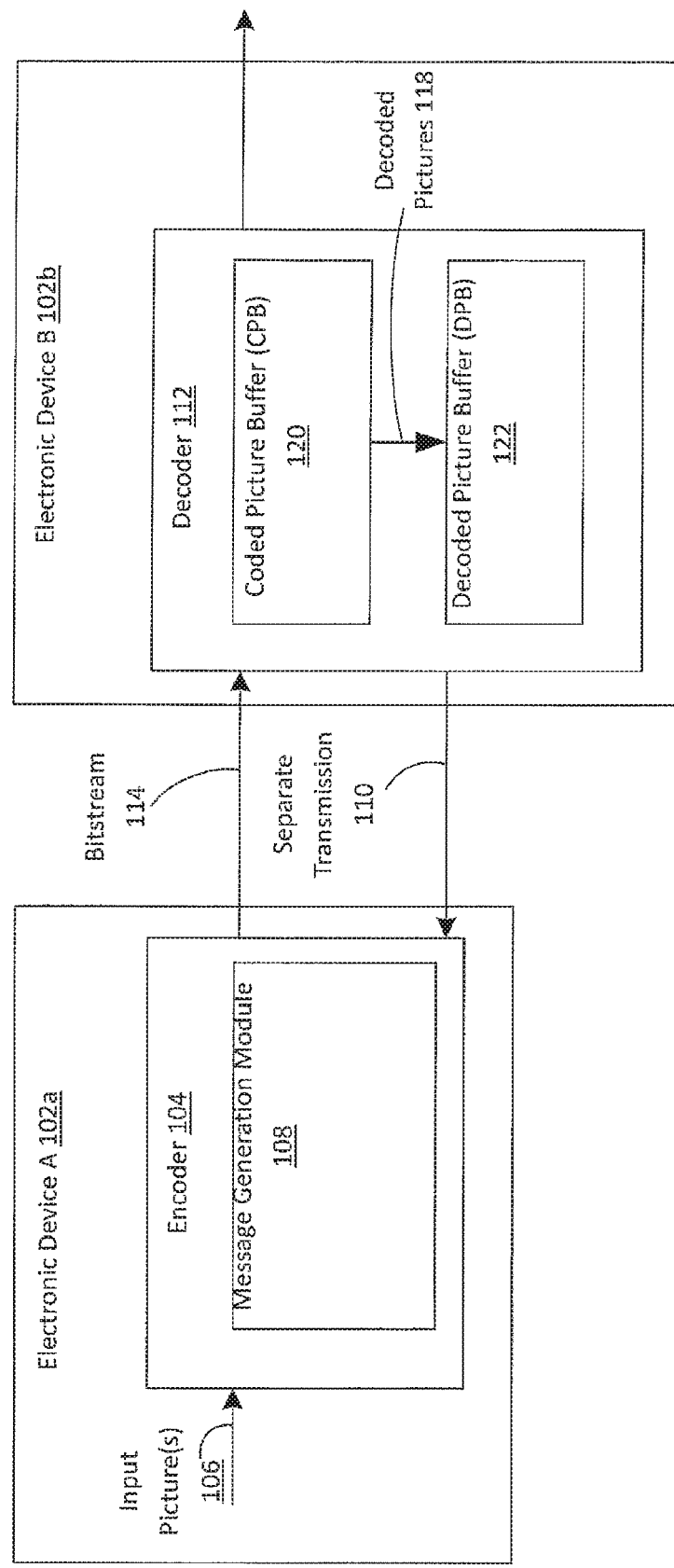
FIG. 1A is a block diagram illustrating an example of one or more electronic devices in which systems and methods for sending a message and buffering a bitstream may be implemented.

FIG. 1A is a block diagram illustrating an example of one or more electronic devices 102 in which systems and methods for sending a message and buffering a bitstream may be implemented. In this example, electronic device A 102a and electronic device B 102b are illustrated. However, it should be noted that one or more of the features and functionality described in relation to electronic device A 102a and electronic device B 102b may be combined into a single electronic device in some configurations.

Electronic device A 102a includes an encoder 104. The encoder 104 includes a message generation module 108. Each of the elements included within electronic device A

102a (e.g., the encoder 104 and the message generation module 108) may be implemented in hardware, software or a combination of both.

Electronic device A 102a may obtain one or more input pictures 106. In some configurations, the input picture(s) 106 may be captured on electronic device A 102a using an image sensor, may be retrieved from memory and/or may be received from another electronic device.

The encoder 104 may encode the input picture(s) 106 to produce encoded data. For example, the encoder 104 may encode a series of input pictures 106 (e.g., video). In one configuration, the encoder 104 may be a HEVC encoder. The encoded data may be digital data (e.g., part of a bitstream 114). The encoder 104 may generate overhead signaling based on the input signal.

The message generation module 108 may generate one or more messages. For example, the message generation module 108 may generate one or more SEI messages or other messages. For a Coded Picture Buffer (CPB) that supports operation on a sub-picture level, the electronic device 102 may send sub-picture parameters, (e.g., CPB removal delay parameter). Specifically, the electronic device 102 (e.g., the encoder 104) may determine whether to include a common decoding unit CPB removal delay parameter in a picture timing SEI message. For example, the electronic device may set a flag (e.g., common_du_cpb_removal_delay_flag) to one when the encoder 104 is including
a common decoding unit CPB removal delay parameter (e.g., common_du_cpb_removal_delay) in the picture timing SEI message. When the common decoding unit CPB removal delay parameter is included, the electronic device may generate the common decoding unit CPB removal delay parameter that is applicable to all decoding units in an access unit. In other words, rather than including a decoding unit CPB removal delay parameter for each decoding unit in an access unit, a common parameter may apply to all decoding units in the access unit with which the picture timing SEI message is associated.

In contrast, when the common decoding unit CPB removal delay parameter is not to be included in the picture timing SEI message, the electronic device 102 may generate a separate decoding unit CPB removal delay for each decoding unit in the access unit with which the picture timing SEI message is associated In some configurations, electronic device A 102a may send the message to electronic device B 102b as part of the bitstream 114. In some configurations electronic device A 102a may send the message to electronic device B 102b by a separate transmission 110. For example, the separate transmission may not be part of the bitstream 114. For instance, a picture timing SEI message or other message may be sent using some out-of-band mechanism. It should be noted that, in some configurations, the other message may include one or more of the features of a picture timing SEI message described above. Furthermore, the other message, in one or more aspects, may be utilized similarly to the SEI message described above.

The encoder 104 (and message generation module 108, for example) may produce a bitstream 114. The bitstream 114 may include encoded picture data based on the input picture(s) 106. In some configurations, the bitstream 114 may also include overhead data, such as a picture timing SEI message or other message, slice header(s), PPS(s), etc. As additional input pictures 106 are encoded, the bitstream 114 may include one or more encoded pictures. For instance, the bitstream 114 may include one or more encoded pictures with corresponding overhead data (e.g., a picture timing SEI message or other message).

The bitstream 114 may be provided to a decoder 112. In one example, the bitstream 114 may be transmitted to electronic device B 102b using a wired or wireless link. In some cases, this may be done over a network, such as the Internet or a Local Area Network (LAN). As illustrated in FIG. 1A, the decoder 112 may be implemented on electronic device B 102b separately from the encoder 104 on electronic device A 102a. However, it should be noted that the encoder 104 and decoder 112 may be implemented on the same electronic device in some configurations. In an implementation where the encoder 104 and decoder 112 are implemented on the same electronic device, for instance, the bitstream 114 may be provided over a bus to the decoder 112 or stored in memory for retrieval by the decoder 112.

The decoder 112 may be implemented in hardware, software or a combination of both. In one configuration, the decoder 112 may be a HEVC decoder. The decoder 112 may receive (e.g., obtain) the bitstream 114. The decoder 112 may generate one or more decoded pictures 118 based on the bitstream 114. The decoded picture(s) 118 may be displayed, played back, stored in memory and/or transmitted to another device, etc.

The decoder 112 may include a CPB 120. The CPB 120 may temporarily store encoded pictures. The CPB 120 may use parameters found in a picture timing SEI message to determine when to remove data. When the CPB 120 supports operation on a sub-picture level, individual decoding units may be removed rather than entire access units at one time. The decoder 112 may include a Decoded Picture Buffer (DPB) 122. Each decoded picture is placed in the DPB 122 for being referenced by the decoding process as well as for output and cropping. A decoded picture is removed from the DPB at the later of the DPB output time or the time that it becomes no longer needed for inter-prediction reference.

The decoder 112 may receive a message (e.g., picture timing SEI message or other message). The decoder 112 may also determine whether the received message includes a common decoding unit CPB removal delay parameter (e.g., common_du_cpb_removal_delay). This may include identifying a flag (e.g., common_du_cpb_removal_delay_flag) that is set when the common parameter is present in the picture timing SEI message. If the common parameter is present, the decoder 112 may determine the common decoding unit CPB removal delay parameter applicable to all decoding units in the access unit. If the common parameter is not present, the decoder 112 may determine a separate decoding unit CPB removal delay parameter for each decoding unit in the access unit. The decoder 112 may also remove decoding units from the CPB 120 using either the common decoding unit CPB removal delay parameter or the separate decoding unit CPB removal delay parameters.

The hypothetical reference decoder (HRD) described above may be one example of the decoder 112 illustrated in FIG. 1A. Thus, an electronic device 102 may operate in accordance with the HRD and CPB 120 and DPB 122 described above, in some configurations.

It should be noted that one or more of the elements or parts thereof included in the electronic device(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an Application-Specific Integrated Circuit (ASIC), a Large-Scale Integrated circuit (LSI) or integrated circuit, etc.

Figure 1B:
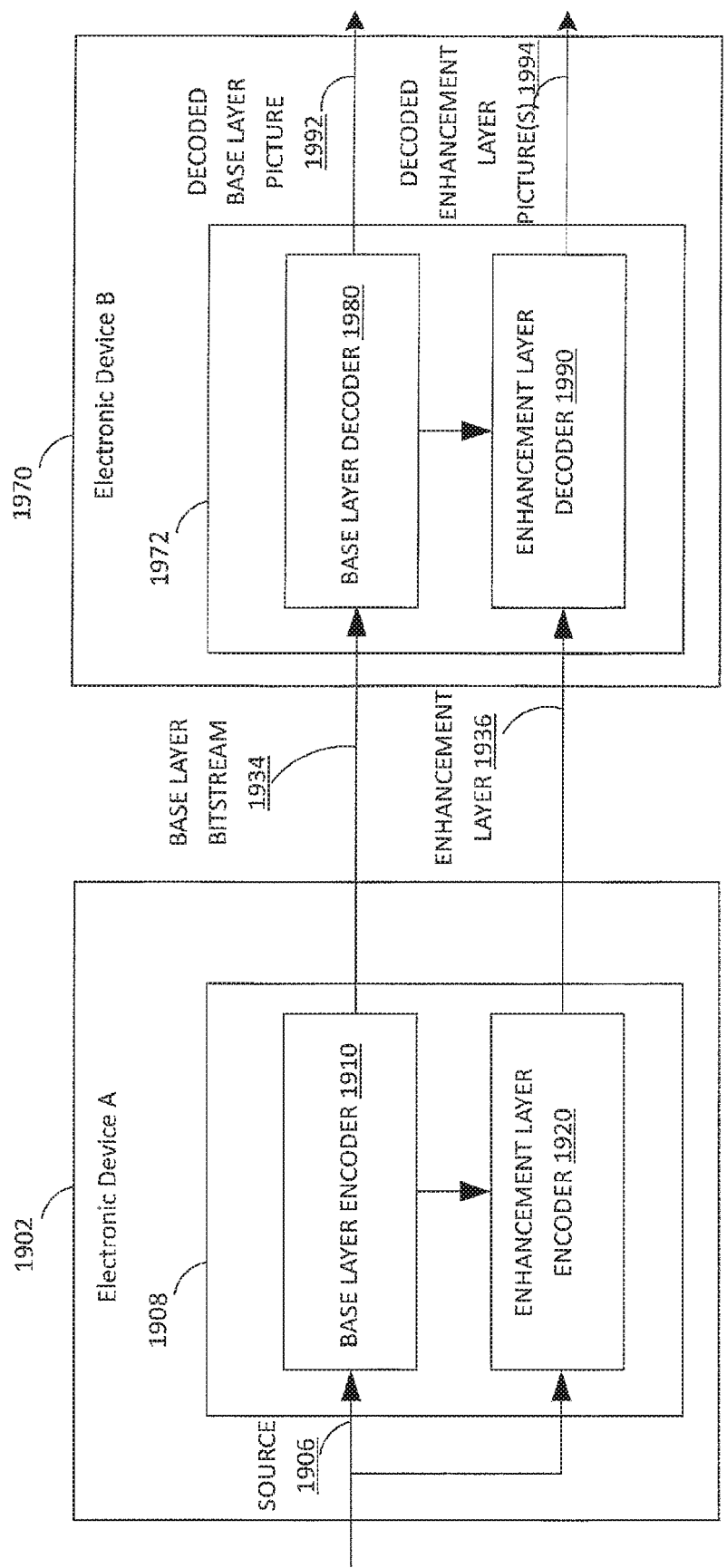
FIG. 1B is another block diagram illustrating an example of one or more electronic devices in which systems and methods for sending a message and buffering a bitstream may be implemented.

FIG. 1B is a block diagram illustrating another example of an encoder 1908 and a decoder 1972. In this example, electronic device A 1902 and electronic device B 1970 are illustrated. However, it should be noted that the features and functionality described in relation to electronic device A 1902 and electronic device B 1970 may be combined into a single electronic device in some configurations.

Electronic device A 1902 includes the encoder 1908. The encoder 1908 may include a base layer encoder 1910 and an enhancement layer encoder 1920. The video encoder 1908 is suitable for scalable video coding and multi-view video coding, as described later. The encoder 1908 may be implemented in hardware, software or a combination of both. In one configuration, the encoder 1908 may be a high-efficiency video coding (HEVC) coder, including scalable and/or multi-view. Other coders may likewise be used. Electronic device A 1902 may obtain a source 1906. In some configurations, the source 1906 may be captured on electronic device A 1902 using an image sensor, retrieved from memory or received from another electronic device.

The encoder 1908 may code the source 1906 to produce a base layer bitstream 1934 and an enhancement layer bitstream 1936. For example, the encoder 1908 may code a series of pictures (e.g., video) in the source 1906. In particular, for scalable video encoding for SNR scalability also known as quality scalability the same source 1906 may be provided to the base layer and the enhancement layer encoder. In particular, for scalable video encoding for spatial scalability a downsampled source may be used for the base layer encoder. In particular, for multi-view encoding a different view source may be used for the base layer encoder and the enhancement layer encoder. The encoder 1908 may be similar to the encoder 1782 described later in connection with FIG. 2B.

The bitstreams 1934, 1936 may include coded picture data based on the source 1906. In some configurations, the bitstreams 1934, 1936 may also include overhead data, such as slice header information, PPS information, etc. As additional pictures in the source 1906 are coded, the bitstreams 1934, 1936 may include one or more coded pictures.

The bitstreams 1934, 1936 may be provided to the decoder 1972. The decoder 1972 may include a base layer decoder 1980 and an enhancement layer decoder 1990. The video decoder 1972 is suitable for scalable video decoding and multi-view video decoding. In one example, the bitstreams 1934, 1936 may be transmitted to electronic device B 1970 using a wired or wireless link. In some cases, this may be done over a network, such as the Internet or a Local Area Network (LAN). As illustrated in FIG. 1B, the decoder 1972 may be implemented on electronic device B 1970 separately from the encoder 1908 on electronic device A 1902. However, it should be noted that the encoder 1908 and decoder 1972 may be implemented on the same electronic device in some configurations. In an implementation where the encoder 1908 and decoder 1972 are implemented on the same electronic device, for instance, the bitstreams 1934, 1936 may be provided over a bus to the decoder 1972 or stored in memory for retrieval by the decoder 1972. The decoder 1972 may provide a decoded base layer 1992 and decoded enhancement layer picture(s) 1994 as output.

The decoder 1972 may be implemented in hardware, software or a combination of both. In one configuration, the decoder 1972 may be a high-efficiency video coding (HEVC) decoder, including scalable and/or multi-view. Other decoders may likewise be used. The decoder 1972 may be similar to the decoder 1812 described later in connection with FIG. 3B. Also, the base layer encoder and/or the enhancement layer encoder may each include a message generation module, such as that described in relation to FIG. 1A. Also, the base layer decoder and/or the enhancement layer decoder may include a coded picture buffer and/or a decoded picture buffer, such as that described in relation to FIG. 1A. In addition, the electronic devices of FIG. 1B may operate in accordance with the functions of the electronic devices of FIG. 1A, as applicable.

Figure 2A:
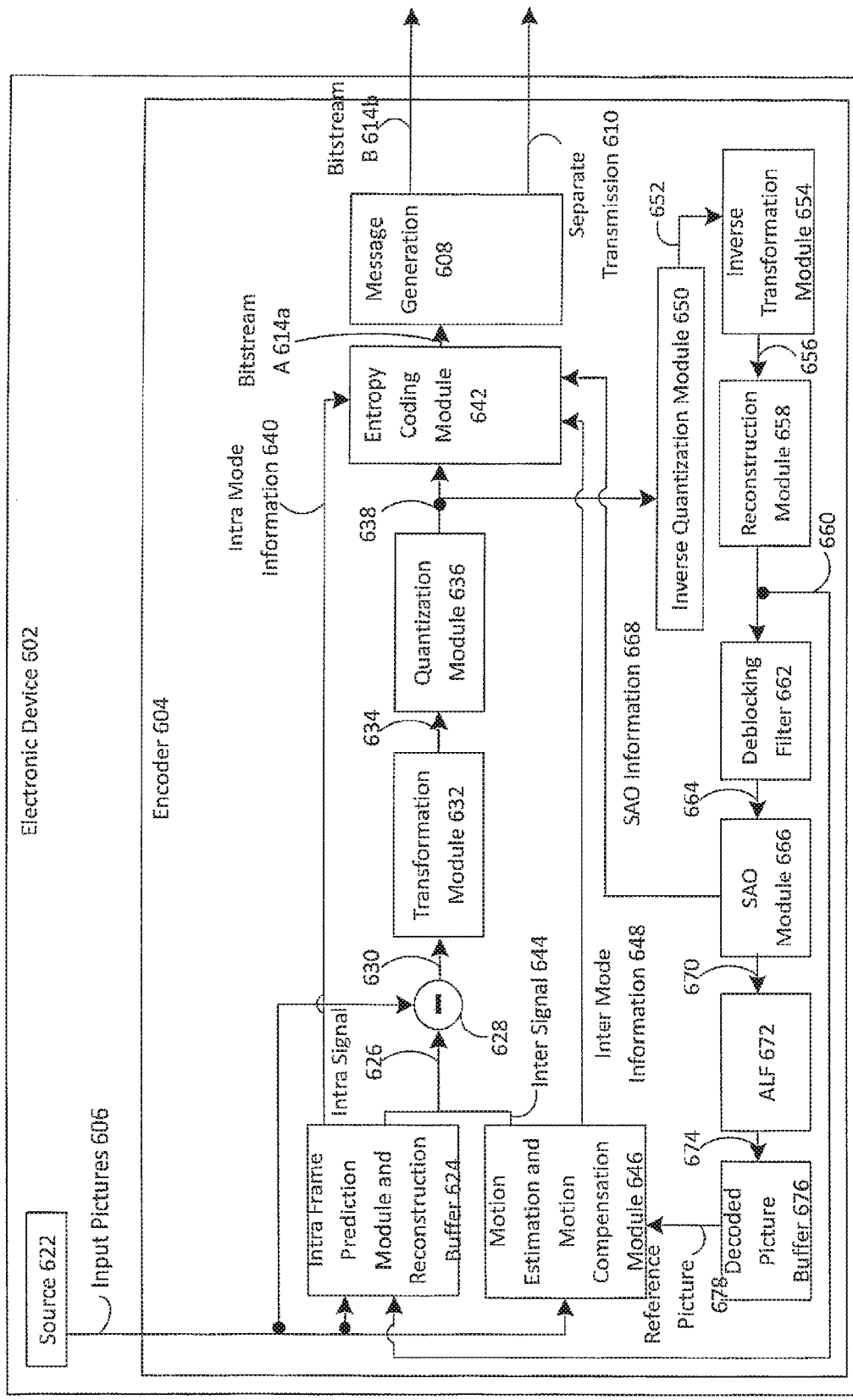
FIG. 2A is a block diagram illustrating one configuration of an encoder 604 on an electronic device.

FIG. 2A is a block diagram illustrating one configuration of an encoder 604 on an electronic device 602. It should be noted that one or more of the elements illustrated as included within the electronic device 602 may be implemented in hardware, software or a combination of both. For example, the electronic device 602 includes an encoder 604, which may be implemented in hardware, software or a combination of both. For instance, the encoder 604 may be implemented as a circuit, integrated circuit, application-specific integrated circuit (ASIC), processor in electronic communication with memory with executable instructions, firmware, field-programmable gate array (FPGA), etc., or a combination thereof. In some configurations, the encoder 604 may be a HEVC coder.

The electronic device 602 may include a source 622. The source 622 may provide picture or image data (e.g., video) as one or more input pictures 606 to the encoder 604. Examples of the source 622 may include image sensors, memory, communication interfaces, network interfaces, wireless receivers, ports, etc.

One or more input pictures 606 may be provided to an intra-frame prediction module and reconstruction buffer 624. An input picture 606 may also be provided to a motion estimation and motion compensation module 646 and to a subtraction module 628.

The intra-frame prediction module and reconstruction buffer 624 may generate intra mode information 640 and an intra-signal 626 based on one or more input pictures 606 and reconstructed data 660. The motion estimation and motion compensation module 646 may generate inter mode information 648 and an inter signal 644 based on one or more input pictures 606 and a reference picture 678 from decoded picture buffer 676. In some configurations, the decoded picture buffer 676 may include data from one or more reference pictures in the decoded picture buffer 676.

The encoder 604 may select between the intra signal 626 and the inter signal 644 in accordance with a mode. The intra signal 626 may be used in order to exploit spatial characteristics within a picture in an intra-coding mode. The inter signal 644 may be used in order to exploit temporal characteristics between pictures in an inter coding mode. While in the intra coding mode, the intra signal 626 may be provided to the subtraction module 628 and the intra mode information 640 may be provided to an entropy coding module 642. While in the inter coding mode, the inter signal 644 may be provided to the subtraction module 628 and the inter mode information 648 may be provided to the entropy coding module 642.

Either the intra signal 626 or the inter signal 644 (depending on the mode) is subtracted from an input picture 606 at the subtraction module 628 in order to produce a prediction residual 630. The prediction residual 630 is provided to a transformation module 632. The transformation module 632 may compress the prediction residual 630 to produce a transformed signal 634 that is provided to a quantization module 636. The quantization module 636 quantizes the transformed signal 634 to produce transformed and quantized coefficients (TQCs) 638.

The TQCs 638 are provided to an entropy coding module 642 and an inverse quantization module 650. The inverse quantization module 650 performs inverse quantization on the TQCs 638 to produce an inverse quantized signal 652 that is provided to an inverse transformation module 654. The inverse transformation module 654 decompresses the inverse quantized signal 652 to produce a decompressed signal 656 that is provided to a reconstruction module 658.

The reconstruction module 658 may produce reconstructed data 660 based on the decompressed signal 656. For example, the reconstruction module 658 may reconstruct (modified) pictures. The reconstructed data 660 may be provided to a deblocking filter 662 and to the intra prediction module and reconstruction buffer 624. The deblocking filter 662 may produce a filtered signal 664 based on the reconstructed data 660.

The filtered signal 664 may be provided to a sample adaptive offset (SAO) module 666. The SAO module 666 may produce SAO information 668 that is provided to the entropy coding module 642 and an SAO signal 670 that is provided to an adaptive loop filter (ALF) 672. The ALF 672 produces an ALF signal 674 that is provided to the decoded picture buffer 676. The ALF signal 674 may include data from one or more pictures that may be used as reference pictures.

The entropy coding module 642 may code the TQCs 638 to produce bitstream A 614*a* (e.g., encoded picture data). For example, the entropy coding module 642 may code the TQCs 638 using Context-Adaptive Variable Length Coding (CAVLC) or Context-Adaptive Binary Arithmetic Coding (CABAC). In particular, the entropy coding module 642 may code the TQCs 638 based on one or more of intra mode information 640, inter mode information 648 and SAO information 668. Bitstream A 614*a* (e.g., encoded picture data) may be provided to a message generation module 608. The message generation module 608 may be configured similarly to the message generation module 108 described in connection with FIG. 1

For example, the message generation module 608 may generate a message (e.g., picture timing SEI message or other message) including sub-picture parameters. The sub-picture parameters may include one or more removal delays for decoding units (e.g., common_du_cpb_removal_delay or du_cpb_removal_delay[i]) and one or more NAL parameters (e.g., common_num_nalus_in_du_minus1 or num_nalus_in_du_minus1[i]). In some configurations, the message may be inserted into bitstream A 614*a* to produce bitstream B 614*b*. Thus, the message may be generated after the entire bitstream A 614*a* is generated (e.g., after most of bitstream B 614*b* is generated), for example. In other configurations, the message may not be inserted into bitstream A 614*a* (in which case bitstream B 614*b* may be the same as bitstream A 614*a*), but may be provided in a separate transmission 610.

In some configurations, the electronic device 602 sends the bitstream 614 to another electronic device. For example, the bitstream 614 may be provided to a communication interface, network interface, wireless transmitter, port, etc. For instance, the bitstream 614 may be transmitted to another electronic device via LAN, the Internet, a cellular phone base station, etc. The bitstream 614 may additionally or alternatively be stored in memory or other component on the electronic device 602.

Figure 2B:
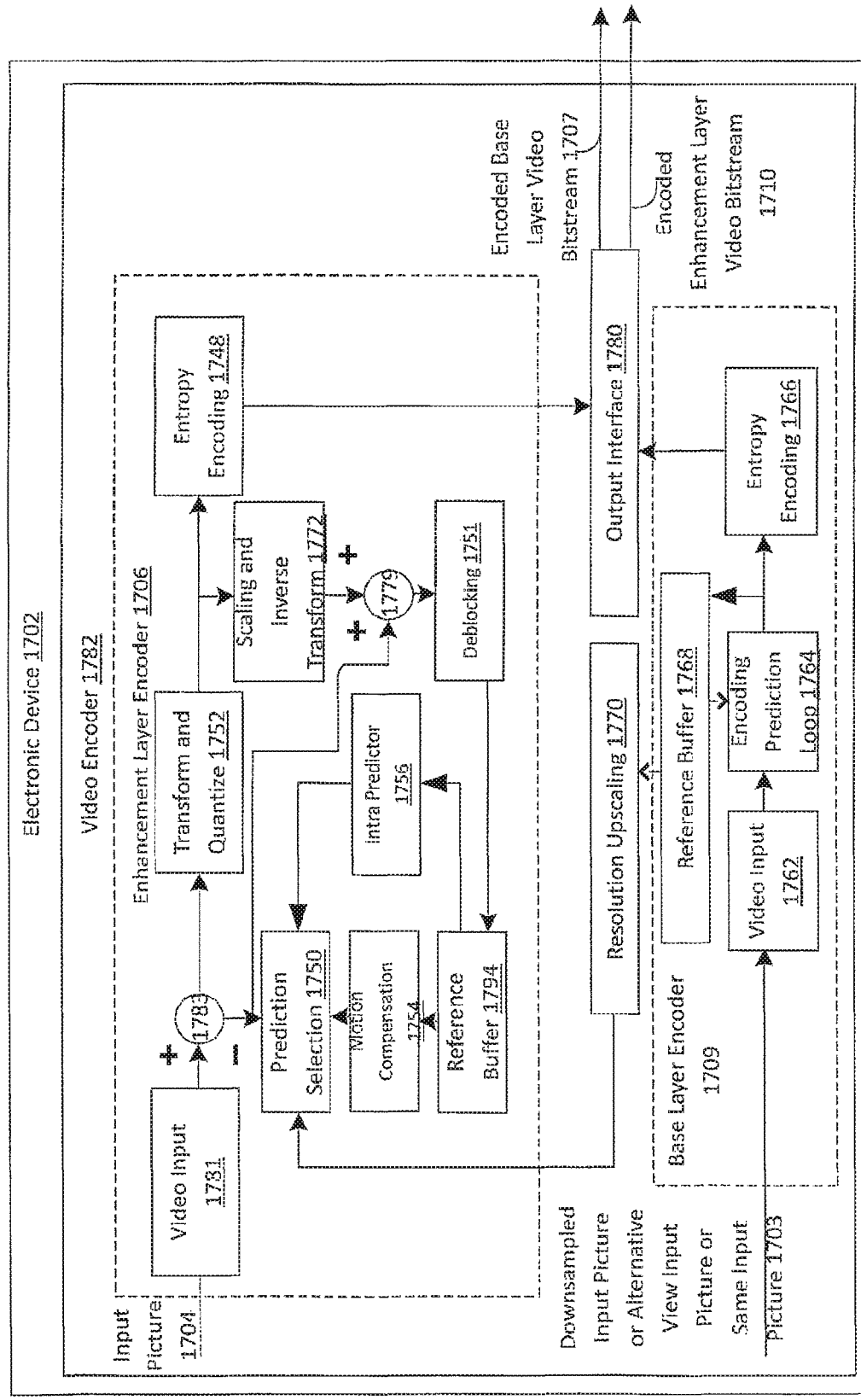
FIG. 2B is another block diagram illustrating one configuration of an encoder 604 on an electronic device.

FIG. 2B is a block diagram illustrating one configuration of a video encoder 1782 on an electronic device 1702. The video encoder 1782 may include an enhancement layer encoder 1706, a base layer encoder 1709, a resolution upscaling block 1770 and an output interface 1780. The video encoder of FIG. 2B, for example, is suitable for scalable video coding and multi-view video coding, as described herein.

The enhancement layer encoder 1706 may include a video input 1781 that receives an input picture 1704. The output of the video input 1781 may be provided to an adder/subtractor 1783 that receives an output of a prediction selection 1750. The output of the adder/subtractor 1783 may be provided to a transform and quantize block 1752. The output of the transform and quantize block 1752 may be provided to an entropy encoding 1748 block and a scaling and inverse transform block 1772. After entropy encoding 1748 is performed, the output of the entropy encoding block 1748 may be provided to the output interface 1780. The output interface 1780 may output both the encoded base layer video bitstream 1707 and the encoded enhancement layer video bitstream 1710.

The output of the scaling and inverse transform block 1772 may be provided to an adder 1779. The adder 1779 may also receive the output of the prediction selection 1750. The output of the adder 1779 may be provided to a deblocking filter 1751. The output of the deblocking filter 1751 may be provided to a reference buffer 1794. An output of the reference buffer 1794 may be provided to a motion compensation block 1754. The output of the motion compensation block 1754 may be provided to the prediction selection 1750. An output of the reference buffer 1794 may also be provided to an intra predictor 1756. The output of the intra predictor 1756 may be provided to the prediction selection 1750. The prediction selection 1750 may also receive an output of the resolution upscaling block 1770.

The base layer encoder 1709 may include a video input 1762 that receives a downsampled input picture, or other image content suitable for combing with another image, or an alternative view input picture or the same input picture 1703 (i.e., the same as the input picture 1704 received by the enhancement layer encoder 1706). The output of the video input 1762 may be provided to an encoding prediction loop 1764. Entropy encoding 1766 may be provided on the output of the encoding prediction loop 1764. The output of the encoding prediction loop 1764 may also be provided to a reference buffer 1768. The reference buffer 1768 may provide feedback to the encoding prediction loop 1764. The output of the reference buffer 1768 may also be provided to the resolution upscaling block 1770. Once entropy encoding 1766 has been performed, the output may be provided to the output interface 1780. The encoded base layer video bitstream 1707 and/or the encoded enhancement layer video bitstream 1710 may be provided to one or more message generation modules, as desired.

Figure 3A:
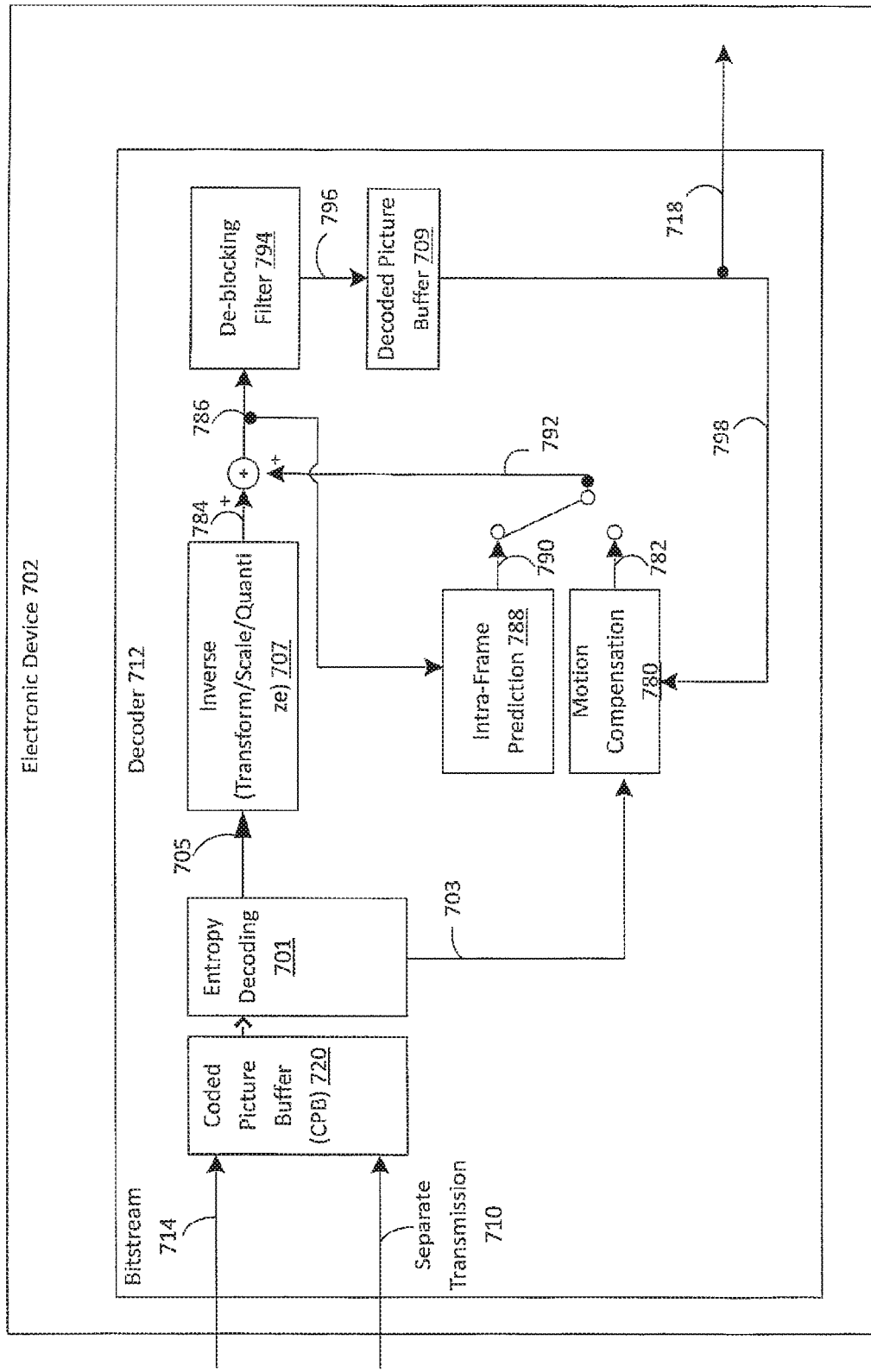
FIG. 3A is a block diagram illustrating one configuration of a decoder on an electronic device.

FIG. 3A is a block diagram illustrating one configuration of a decoder 712 on an electronic device 702. The decoder 712 may be included in an electronic device 702. For example, the decoder 712 may be a HEVC decoder. The decoder 712 and one or more of the elements illustrated as included in the decoder 712 may be implemented in hardware, software or a combination of both. The decoder 712 may receive a bitstream 714 (e.g., one or more encoded pictures and overhead data included in the bitstream 714) for decoding. In some configurations, the received bitstream 714 may include received overhead data, such as a message (e.g., picture timing SEI message or other message), slice header, PPS, etc. In some configurations, the decoder 712 may additionally receive a separate transmission 710. The separate transmission 710 may include a message (e.g., a picture timing SEI message or other message). For example, a picture timing SEI message or other message may be received in a separate transmission 710 instead of in the bitstream 714. However, it should be noted that the separate transmission 710 may be optional and may not be utilized in some configurations.

The decoder 712 includes a CPB 720. The CPB 720 may be configured similarly to the CPB 120 described in connection with FIG. 1 above. The decoder 712 may receive a message (e.g., picture timing SEI message or other message) with sub-picture parameters and remove and decode decoding units in an access unit based on the subpicture parameters. It should be noted that one or more access units may be included in the bitstream and may include one or more of encoded picture data and overhead data.

The Coded Picture Buffer (CPB) 720 may provide encoded picture data to an entropy decoding module 701. The encoded picture data may be entropy decoded by an entropy decoding module 701, thereby producing a motion information signal 703 and quantized, scaled and/or transformed coefficients 705.

The motion information signal 703 may be combined with a portion of a reference frame signal 798 from a decoded picture buffer 709 at a motion compensation module 780, which may produce an inter-frame prediction signal 782. The quantized, descaled and/or transformed coefficients 705 may be inverse quantized, scaled and inverse transformed by an inverse module 707, thereby producing a decoded residual signal 784. The decoded residual signal 784 may be added to a prediction signal 792 to produce a combined signal 786. The prediction signal 792 may be a signal selected from either the inter-frame prediction signal 782 produced by the motion compensation module 780 or an intra-frame prediction signal 790 produced by an intra-frame prediction module 788. In some configurations, this signal selection may be based on (e.g., controlled by) the bitstream 714.

The intra-frame prediction signal 790 may be predicted from previously decoded information from the combined signal 786 (in the current frame, for example). The combined signal 786 may also be filtered by a de-blocking filter 794. The resulting filtered signal 796 may be written to decoded picture buffer 709. The resulting filtered signal 796 may include a decoded picture. The decoded picture buffer 709 may provide a decoded picture which may be outputted 718. In some cases 709 may be a considered as frame memory.

Figure 3B:
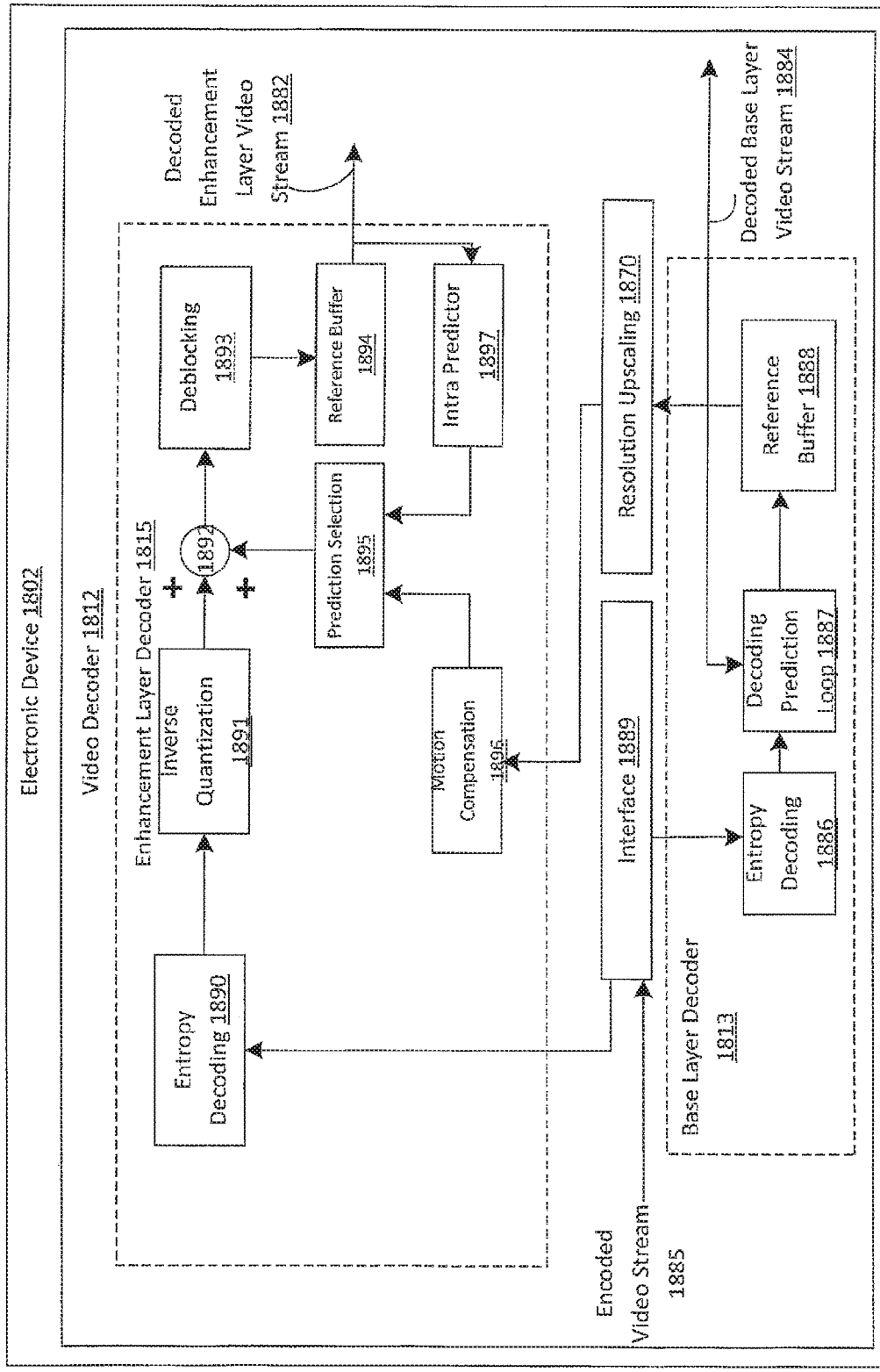
FIG. 3B is another block diagram illustrating one configuration of a decoder on an electronic device.

FIG. 3B is a block diagram illustrating one configuration of a video decoder 1812 on an electronic device 1802. The video decoder 1812 may include an enhancement layer decoder 1815 and a base layer decoder 1813. The video decoder 1812 may also include an interface 1889 and resolution upscaling 1870. The video decoder of FIG. 3B, for example, is suitable for scalable video coding and multi-view video encoded, as described herein.

The interface 1889 may receive an encoded video stream 1885. The encoded video stream 1885 may consist of base layer encoded video stream and enhancement layer encoded video stream. These two streams may be sent separately or together. The interface 1889 may provide some or all of the encoded video stream 1885 to an entropy decoding block 1886 in the base layer decoder 1813. The output of the entropy decoding block 1886 may be provided to a decoding prediction loop 1887. The output of the decoding prediction loop 1887 may be provided to a reference buffer 1888. The reference buffer may provide feedback to the decoding prediction loop 1887. The reference buffer 1888 may also output the decoded base layer video stream 1884.

The interface 1889 may also provide some or all of the encoded video stream 1885 to an entropy decoding block 1890 in the enhancement layer decoder 1815. The output of the entropy decoding block 1890 may be provided to an inverse quantization block 1891. The output of the inverse quantization block 1891 may be provided to an adder 1892. The adder 1892 may add the output of the inverse quantization block 1891 and the output of a prediction selection block 1895. The output of the adder 1892 may be provided to a deblocking block 1893. The output of the deblocking block 1893 may be provided to a reference buffer 1894. The reference buffer 1894 may output the decoded enhancement layer video stream 1882. The output of the reference buffer 1894 may also be provided to an intra predictor 1897. The enhancement layer decoder 1815 may include motion compensation 1896. The motion compensation 1896 may be performed after the resolution upscaling 1870. The prediction selection block 1895 may receive the output of the intra predictor 1897 and the output of the motion compensation 1896. Also, the decoder may include one or more coded picture buffers, as desired, such as together with the interface 1889.

Figure 4:
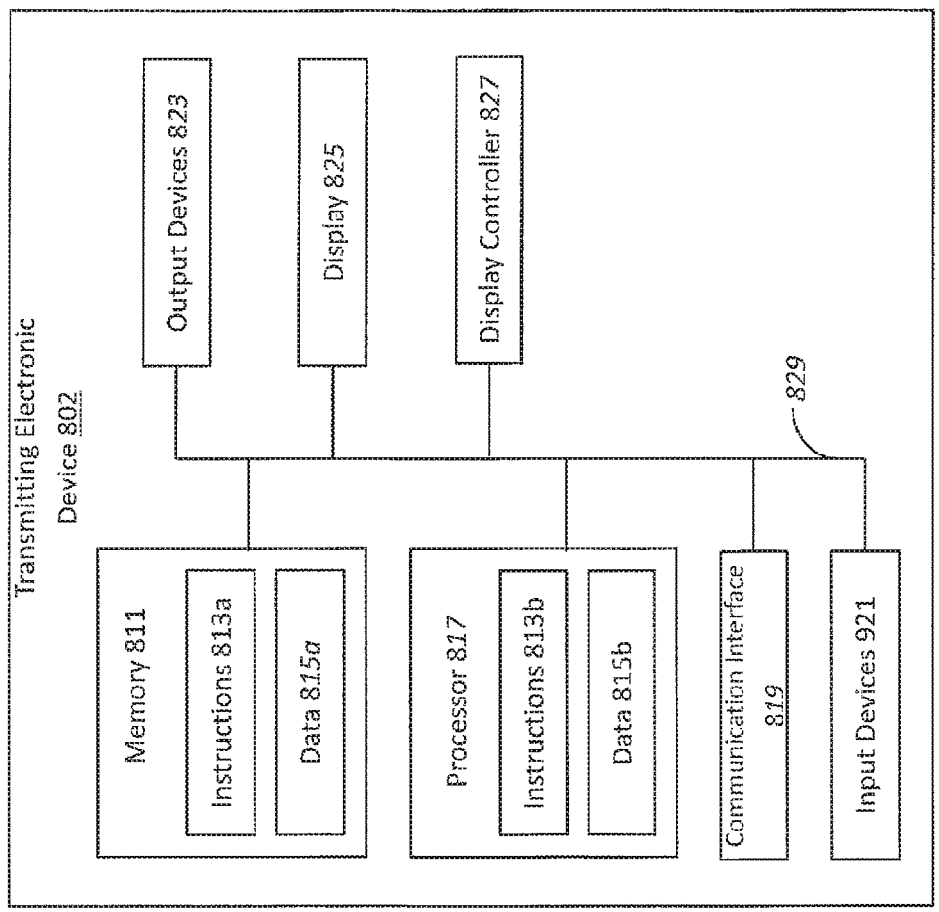
FIG. 4 illustrates various components that may be utilized in a transmitting electronic device.

FIG. 4 illustrates various components that may be utilized in a transmitting electronic device 802. One or more of the electronic devices 102, 602, 702 described herein may be implemented in accordance with the transmitting electronic device 802 illustrated in FIG. 4.

The transmitting electronic device 802 includes a processor 817 that controls operation of the electronic device 802. The processor 817 may also be referred to as a CPU. Memory 811, which may include both read-only memory (ROM), random access memory (RAM) or any type of device that may store information, provides instructions 813a (e.g., executable instructions) and data 815a to the processor 817. A portion of the memory 811 may also include non-volatile random access memory (NVRAM). The memory 811 may be in electronic communication with the processor 817.

Instructions 813b and data 815b may also reside in the processor 817. Instructions 813b and/or data 815b loaded into the processor 817 may also include instructions 813a and/or data 815a from memory 811 that were loaded for execution or processing by the processor 817. The instructions 813b may be executed by the processor 817 to implement the systems and methods disclosed herein. For example, the instructions 813b may be executable to perform one or more of the methods described above.

The transmitting electronic device 802 may include one or more communication interfaces 819 for communicating with other electronic devices (e.g., receiving electronic device). The communication interfaces 819 may be based on wired communication technology, wireless communication technology, or both. Examples of a communication interface 819 include a serial port, a parallel port, a Universal Serial Bus (USB), an Ethernet adapter, an IEEE 1394 bus interface, a small computer system interface (SCSI) bus interface, an infrared (IR) communication port, a BLUETOOTH wireless communication adapter, a wireless transceiver in accordance with 3rd Generation Partnership Project (3GPP) specifications and so forth.

The transmitting electronic device 802 may include one or more output devices 823 and one or more input devices 821. Examples of output devices 823 include a speaker, printer, etc. One type of output device that may be included in an electronic device 802 is a display device 825. Display devices 825 used with configurations disclosed herein may utilize any suitable image projection technology, such as a cathode ray tube (CRT), liquid crystal display (LCD), light-emitting diode (LED), gas plasma, electroluminescence or the like. A display controller 827 may be provided for converting data stored in the memory 811 into text, graphics, and/or moving images (as appropriate) shown on the display 825. Examples of input devices 821 include a keyboard, mouse, microphone, remote control device, button, joystick, trackball, touchpad, touchscreen, lightpen, etc.

The various components of the transmitting electronic device 802 are coupled together by a bus system 829, which may include a power bus, a control signal bus and a status signal bus, in addition to a data bus. However, for the sake of clarity, the various buses are illustrated in FIG. 4 as the bus system 829. The transmitting electronic device 802 illustrated in FIG. 4 is a functional block diagram rather than a listing of specific components.

Figure 5:
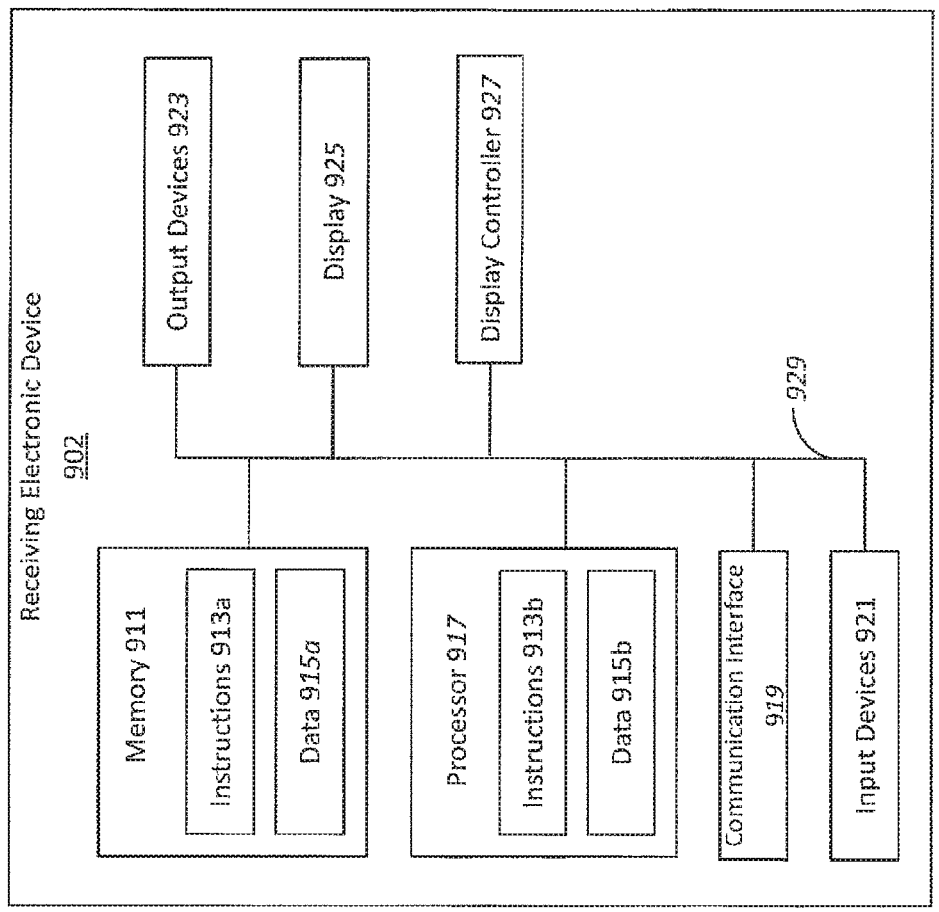
FIG. 5 is a block diagram illustrating various components that may be utilized in a receiving electronic device.

FIG. 5 is a block diagram illustrating various components that may be utilized in a receiving electronic device 902. One or more of the electronic devices 102, 602, 702 described herein may be implemented in accordance with the receiving electronic device 902 illustrated in FIG. 5.

The receiving electronic device 902 includes a processor 917 that controls operation of the electronic device 902. The processor 917 may also be referred to as a CPU. Memory 911, which may include both read-only memory (ROM), random access memory (RAM) or any type of device that may store information, provides instructions 913a (e.g., executable instructions) and data 915a to the processor 917. A portion of the memory 911 may also include non-volatile random access memory (NVRAM). The memory 911 may be in electronic communication with the processor 917.

Instructions 913b and data 915b may also reside in the processor 917. Instructions 913b and/or data 915b loaded into the processor 917 may also include instructions 913a and/or data 915a from memory 911 that were loaded for execution or processing by the processor 917. The instructions 913b may be executed by the processor 917 to implement the systems and methods disclosed herein. For example, the instructions 913b may be executable to perform one or more of the methods described above.

The receiving electronic device 902 may include one or more communication interfaces 919 for communicating with other electronic devices (e.g., a transmitting electronic device). The communication interface 919 may be based on wired communication technology, wireless communication technology, or both. Examples of a communication interface 919 include a serial port, a parallel port, a Universal Serial Bus (USB), an Ethernet adapter, an IEEE 1394 bus interface, a small computer system interface (SCSI) bus interface, an infrared (IR) communication port, a BLUETOOTH wireless communication adapter, a wireless transceiver in accordance with $3_{rd}$ Generation Partnership Project (3GPP) specifications and so forth.

The receiving electronic device 902 may include one or more output devices 923 and one or more input devices 921. Examples of output devices 923 include a speaker, printer, etc. One type of output device that may be included in an electronic device 902 is a display device 925. Display devices 925 used with configurations disclosed herein may utilize any suitable image projection technology, such as a cathode ray tube (CRT), liquid crystal display (LCD), light-emitting diode (LED), gas plasma, electroluminescence or the like. A display controller 927 may be provided for converting data stored in the memory 911 into text, graphics, and/or moving images (as appropriate) shown on the display 925. Examples of input devices 921 include a keyboard, mouse, microphone, remote control device, button, joystick, trackball, touchpad, touchscreen, lightpen, etc.

The various components of the receiving electronic device 902 are coupled together by a bus system 929, which may include a power bus, a control signal bus and a status signal bus, in addition to a data bus. However, for the sake of clarity, the various buses are illustrated in FIG. 5 as the bus system 929. The receiving electronic device 902 illustrated in FIG. 5 is a functional block diagram rather than a listing of specific components.

Figure 6:
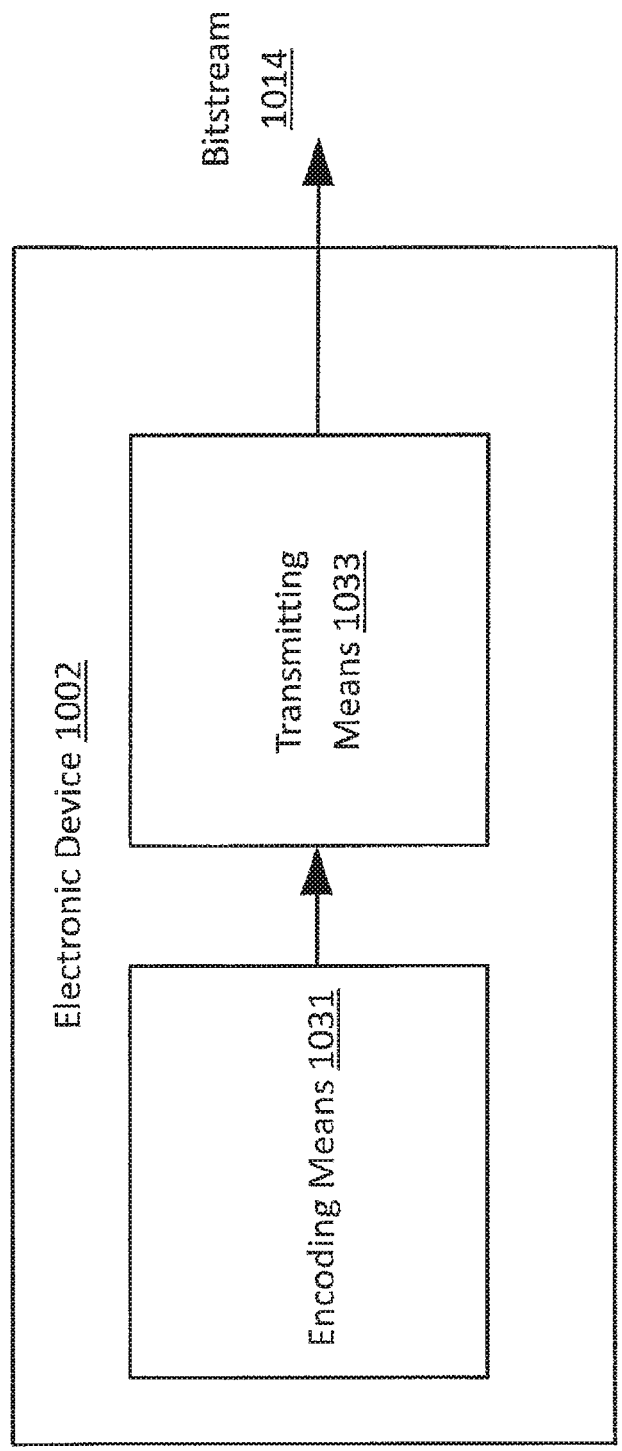
FIG. 6 is a block diagram illustrating one configuration of an electronic device in which systems and methods for sending a message may be implemented.

FIG. 6 is a block diagram illustrating one configuration of an electronic device 1002 in which systems and methods for sending a message may be implemented. The electronic device 1002 includes encoding means 1031 and transmitting means 1033. The encoding means 1031 and transmitting means 1033 may generate a bitstream 1014. FIG. 4 above illustrates one example of a concrete apparatus structure of FIG. 6. A DSP may be realized by software.

Figure 7:
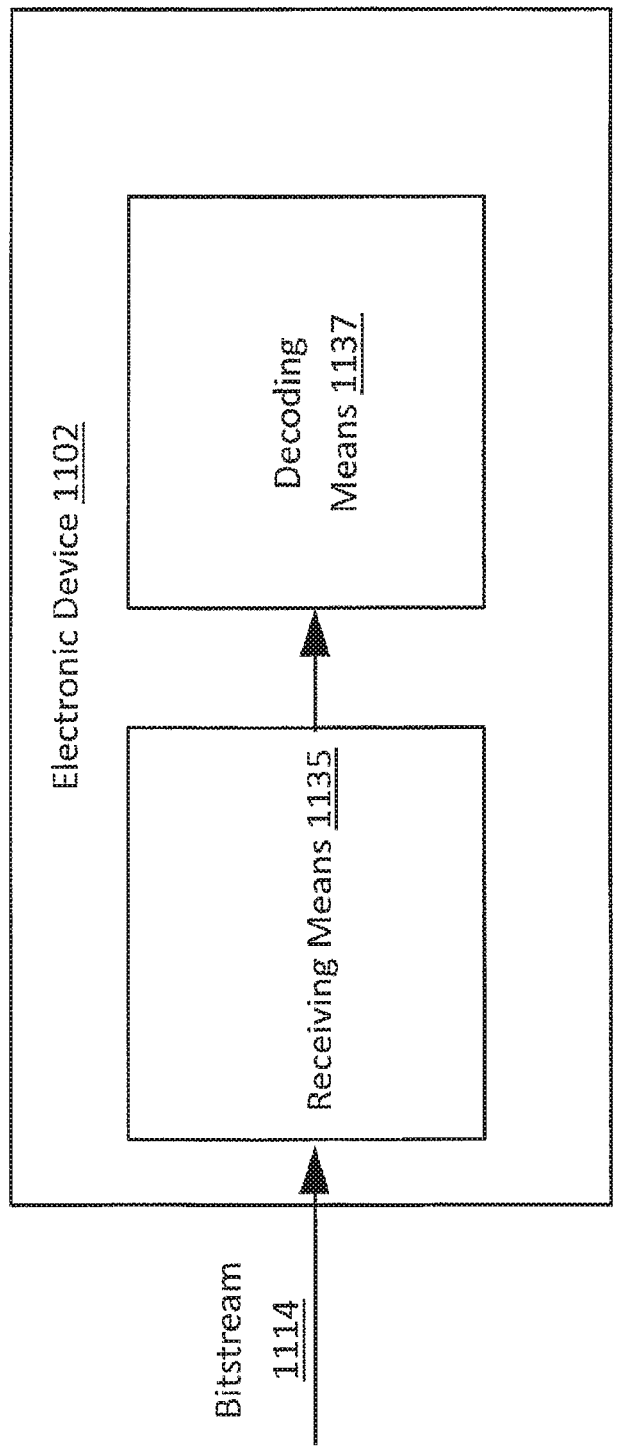
FIG. 7 is a block diagram illustrating one configuration of an electronic device in which systems and methods for buffering a bitstream may be implemented.

FIG. 7 is a block diagram illustrating one configuration of an electronic device 1102 in which systems and methods for buffering a bitstream 1114 may be implemented. The electronic device 1102 may include receiving means 1135 and decoding means 1137. The receiving means 1135 and decoding means 1137 may receive a bitstream 1114. FIG. 5 above illustrates one example of a concrete apparatus structure of FIG. 7. A DSP may be realized by software.

The decoding process for reference picture set (RPS) may be invoked. Reference picture set is a set of reference pictures associated with a picture, consisting of all reference pictures that are prior to the associated picture in decoding order, that may be used for inter prediction of the associated picture or any picture following the associated picture in decoding order.

The bitstream of the video may include a syntax structure that is placed into logical data packets generally referred to as Network Abstraction Layer (NAL) units. Each NAL unit includes a NAL unit header, such as a two-byte NAL unit header (e.g., 16 bits), to identify the purpose of the associated data payload. For example, each coded slice (and/or picture) may be coded in one or more slice (and/or picture) NAL units. Other NAL units may be included for other categories of data, such as for example, supplemental enhancement information, coded slice of temporal sub-layer access (TSA) picture, coded slice of step-wise temporal sub-layer access (STSA) picture, coded slice a non-TSA, non-STSA trailing picture, coded slice of broken link access picture, coded slice of instantaneous decoded refresh picture, coded slice of clean random access picture, coded slice of decodable leading picture, coded slice of tagged for discard picture, video parameter set, sequence parameter set, picture parameter set, access unit delimiter, end of sequence, end of bitstream, filler data, and/or sequence enhancement information message. Table (1) illustrates one example of NAL unit codes and NAL unit type classes. Other NAL unit types may be included, as desired. It should also be understood that the NAL unit type values for the NAL units shown in the Table (1) may be reshuffled and reassigned. Also additional NAL unit types may be added. Also some NAL unit types may be removed.

An intra random access point (IRAP) picture is a coded picture for which each video coding layer NAL unit has nal_unit_type in the range of BLA_W_LP to RSV_I-RAP_VCL23, inclusive as shown in Table (1). An IRAP picture contains only Intra coded (I) slices. An instantaneous decoding refresh (IDR) picture is an IRAP picture for which each video coding layer NAL unit has nal_unit_type equal to IDR_W_RADL or IDR_N_LP as shown in Table 14). An instantaneous decoding refresh (IDR) picture contains only I slices, and may be the first picture in the bitstream in decoding order, or may appear later in the bitstream. Each IDR picture is the first picture of a coded video sequence (CVS) in decoding order. A broken link access (BLA) picture is an IRAP picture for which each video coding layer NAL unit has nal_unit_type equal to BLA_W_LP, BLA_W_RADL, or BLA_N_LP as shown in Table (1). A BLA picture contains only I slices, and may be the first picture in the bitstream in decoding order, or may appear later in the bitstream. Each BLA picture begins a new coded video sequence, and has the same effect on the decoding process as an IDR picture. However, a BLA picture contains syntax elements that specify a non-empty reference picture set. Clean random access (CRA) access unit is an access unit in which the coded picture is a CRA picture. Clean random access (CRA) picture is an IRAP picture for which each VCL NAL unit has nal_unit_type equal to CRA_NUT as shown in Table (1). A CRA picture contains only I slices, and may be the first picture in the bitstream in decoding order, or may appear later in the bitstream. A CRA picture may have associated RADL or RASL pictures. When a CRA picture has NoRaslOutputFlag equal to 1, the associated RASL pictures are not output by the decoder, because they may not be decodable, as they may contain references to pictures that are not present in the bitstream.

A coded video sequence (CVS) may be a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1.

TABLE (1)

| nal_unit_type | Name of nal_unit_type | Content of NAL unit and raw byte sequence payload (RBSP) syntax structure | NAL unit type class |
|---|---|---|---|
| 0 | TRAIL_N | Coded slice segment of a non-TSA, non-STSA trailing picture slice_segment_layer_rbsp( ) | Video Coding Layer (VCL) |
| 1 | TRAIL_R | | |
| 2 | TSA_N | Coded slice segment of a temporal sub-layer access (TSA) picture slice_segment_layer_rbsp( ) | VCL |
| 3 | TSA_R | | |
| 4 | STSA_N | Coded slice segment of an Step-wise Temporal sub-layer access (STSA) picture slice_segment_layer_rbsp( ) | VCL |
| 5 | STSA_R | | |
| 6 | RADL_N | Coded slice segment of a random access decodable leading (RADL) picture slice_segment_layer_rbsp( ) | VCL |
| 7 | RADL_R | | |
| 8 | RASL_N | Coded slice segment of a random access skipped leading (RASL) picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a broken link access (BLA) picture slice_segment_layer_rbsp( ) | VCL |
| 17 | BLA_W_RADL | | |
| 18 | BLA_N_LP | | |
| 19 | IDR_W_RADL | Coded slice segment of an instantaneous decoding refresh (IDR) picture slice_segment_layer_rbsp( ) | VCL |
| 20 | IDR_N_LP | | |
| 21 | CRA_NUT | Coded slice segment of a clean random access (CRA) picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-video coding layer (non-VCL) |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |

TABLE (1)-continued

| nal_unit_type | Name of nal_unit_type | Content of NAL unit and raw byte sequence payload (RBSP) syntax structure | NAL unit type class |
|---|---|---|---|
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | non-VCL |
| 41 . . . 47 | RSV_NVCL41 . . . RSV_NVCL47 | Reserved | non-VCL |
| 48 . . . 63 | UNSPEC48 . . . UNSPEC63 | Unspecified | non-VCL |

Referring to Table (2), the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ('RBSP') data structure contained in the NAL unit as shown in Table (1). The next 6 bits is a "nuh_layer_id" which specify the identifier of the layer. In some cases these six bits may be specified as "nuh_reserved_zero_6bits" instead. The nuh_reserved_zero_6bits may be equal to 0 in the base specification of the standard. In a scalable video coding and/or syntax extensions nuh_layer_id may specify that this particular NAL unit belongs to the layer identified by the value of these 6 bits. The next syntax element is "nuh_temporal_id_plus1". The nuh_temporal_id_plus1 minus 1 may specify a temporal identifier for the NAL unit. The variable temporal identifier TemporalId may be specified as TemporalId=nuh_temporal_id_plus1−1. The temporal identifier TemporalId is used to identify a temporal sub-layer. The variable HighestTid identifies the highest temporal sub-layer to be decoded.

TABLE (2)

| nal_unit_header( ) { | Descriptor |
|---|---|
| forbidden_zero_bit | f(1) |
| nal_unit_type | u(6) |
| nuh_layer_id | u(6) |
| nuh_temporal_id_plus1 | u(3) |
| } | |

Referring to FIG. 8A, as previously described the NAL unit header syntax may include two bytes of data, namely, 16 bits. The first bit is a "forbidden_zero_bit" which is always set to zero at the start of a NAL unit. The next six bits is a "nal_unit_type" which specifies the type of raw byte sequence payloads ('RBSP') data structure contained in the NAL unit. The next 6 bits is a "nuh_reserved_zero_6bits". The nuh_reserved_zero_6bits may be equal to 0 in the base specification of the standard. Other values of nuh_reserved_zero_6bits may be specified as desired. Decoders may ignore (i.e., remove from the bitstream and discard) all NAL units with values of nuh_reserved_zero_6bits not equal to 0 when handling a stream based on the base specification of the standard. In a scalable or other extension nuh_reserved_zero_6bits may specify other values, to signal scalable video coding and/or syntax extensions. In some cases syntax element nuh_reserved_zero_6bits may be called reserved_zero_6bits. In some cases the syntax element nuh_reserved_zero_6bits may be called as layer_id_plus1 or layer_id, as illustrated in FIG. 8B and FIG. 8C. In this case the element layer_id will be layer_id_plus1 minus 1. In this case it may be used to signal information related to layer of scalable coded video. The next syntax element is "nuh_temporal_id_plus1". nuh_temporal_id_plus1 minus 1 may specify a temporal identifier for the NAL unit. The variable temporal identifier TemporalId may be specified as TemporalId=nuh_temporal_id_plus1−1.

Referring to FIG. 9, a general NAL unit syntax structure is illustrated. The NAL unit header two byte syntax of FIG. 8 is included in the reference to nal_unit_header( ) of FIG. 9. The remainder of the NAL unit syntax primarily relates to the RBSP.

One existing technique for using the "nuh_reserved_zero_6bits" is to signal scalable video coding information by partitioning the 6 bits of the nuh_reserved_zero_6bits into distinct bit fields, namely, one or more of a dependency ID, a quality ID, a view ID, and a depth flag, each of which refers to the identification of a different layer of the scalable coded video. Accordingly, the 6 bits indicate what layer of the scalable encoding technique this particular NAL unit belongs to. Then in a data payload, such as a video parameter set ("VPS") extension syntax ("scalability_type") as illustrated in FIG. 10, the information about the layer is defined. The VPS extension syntax of FIG. 10 includes 4 bits for scalability type (syntax element scalability_type) which specifies the scalability types in use in the coded video sequence and the dimensions signaled through layer_id_plus1 (or layer_id) in the NAL unit header. When the scalability type is equal to 0, the coded video sequence conforms to the base specification, thus layer_id_plus1 of all NAL units is equal to 0 and there are no NAL units belonging to an enhancement layer or view. Higher values of the scalability type are interpreted as illustrated in FIG. 11.

The layer_id_dim_len[i] specifies the length, in bits, of the i-th scalability dimension ID. The sum of the values layer_id_dim_len[i] for all i values in the range of 0 to 7 is less than or equal to 6. The vps_extension_byte_alignment_reserved_zero_bit is zero. The vps_layer_id[i] specifies the value of layer_id of the i-th layer to which the following layer dependency information applies. The num_direct_ref_layers[i] specifies the number of layers the i-th layer directly depends on. The ref_layer_id[i][j] identifies the j-th layer the i-th layer directly depends on.

In this manner, the existing technique signals the scalability identifiers in the NAL unit and in the video parameter set to allocate the bits among the scalability types listed in FIG. 11. Then for each scalability type, FIG. 11 defines how many dimensions are supported. For example, scalability type 1 has 2 dimensions (i.e., spatial and quality). For each of the dimensions, the layer_id_dim_len[i] defines the number of bits allocated to each of these two dimensions, where the total sum of all the values of layer_id_dim_len[i] is less than or equal to 6, which is the number of bits in the nuh_reserved_zero_6bits of the NAL unit header. Thus, in combination the technique identifies which types of scalability is in use and how the 6 bits of the NAL unit header are allocated among the scalability.

As previously described, scalable video coding is a technique of encoding a video bitstream that also contains one or more subset bitstreams. A subset video bitstream may be derived by dropping packets from the larger video to reduce the bandwidth required for the subset bitstream. The subset bitstream may represent a lower spatial resolution (smaller screen), lower temporal resolution (lower frame rate), or lower quality video signal. For example, a video bitstream may include 5 subset bitstreams, where each of the subset bitstreams adds additional content to a base bitstream. Hannuksela, et al., "Test Model for Scalable Extensions of High Efficiency Video Coding (HEVC)" JCTVC-L0453, Shanghai, October 2012, is hereby incorporated by reference herein in its entirety. Chen, et al., "SHVC Draft Text 1," JCTVC-L1008, Geneva, March, 2013, is hereby incorporated by reference herein in its entirety. J. Chen, J. Boyce, Y. Ye, M Hannuksela, SHVC Draft 3, JCTVC-N1008, Vienna, August 2013; and Y. Chen, Y.-K. Wang, A. K. Ramasubromanian, MV-HEVC/SHVC HLS: Cross-layer POC Alignment, JCTVC-N0244, Vienna, July 2013; each of which is incorporated by reference herein in its entirety.

As previously described, multi-view video coding is a technique of encoding a video bitstream that also contains one or more other bitstreams representative of alternative views. For example, the multiple views may be a pair of views for stereoscopic video. For example, the multiple views may represent multiple views of the same scene from different viewpoints. The multiple views generally contain a large amount of interview statistical dependencies, since the images are of the same scene from different viewpoints. Therefore, combined temporal and inter-view prediction may achieve efficient multi-view encoding. For example, a frame may be efficiently predicted not only from temporally related frames, but also from the frames of neighboring viewpoints. Hannuksela, et al., "Common specification text for scalable and multiview extensions," JCTVC-L0452, Geneva, January 2013, is hereby incorporated by reference herein in its entirety. Tech, et. al. "MV-HEVC Draft Text 3 (ISO/IEC 23008-2:201x/PDAM2)," JCT3V-C1004_d3, Geneva, January 2013, is hereby incorporated by reference herein in its entirety. G. Tech, K. Wegner, Y. Chen, M. Hannuksela, J. Boyce, "MV-HEVC Draft Text 5 (ISO/IEC 203008-2:201x/PDAM2), JCT3V-E1004, Vienna, August 2013, is hereby incorporated by reference herein in its entirety.

Chen, et al., "SHVC Draft Text 1," JCTVC-L1008, Geneva, January 2013; Hannuksela, et al. "Test Model for Scalable Extensions of High Efficiency Video Coding (HEVC)," JCTVC-L0453-spec-text, Shanghai, October 2012; and Hannuksela, "Draft Text for Multiview Extension of High Efficiency Video Coding (HEVC)," JCTVC-L0452-spec-text-r1, Shanghai, October 2012; each of which is incorporated by reference herein in its entirety.

Referring to FIG. 12, when coding scalable high efficiency coding ("SVHC") the base layer may include one or more SPS and may also include one or more PPS. Also, each enhancement layer may include one or more SPS and may also include one or more PPS. In FIG. 12 SPS+ indicates one or more SPS and PPS+ indicates one or more PPS being signaled for a particular base or enhancement layer. In this manner, for a video bitstream having both a base layer and one or more enhancement layers, the collective number of SPS and PPS data sets becomes significant together with the required bandwidth to transmit such data, which tends to be limited in many applications. With such bandwidth limitations, it is desirable to limit the data that needs to be transmitted, and locate the data in the bitstream in an effective manner. Each layer may have one SPS and/or PPS that is activate at any particular time, and may select a different active SPS and/or PPS, as desired.

An input picture may comprise a plurality of coded tree blocks (e.g., generally referred to herein as blocks) may be partitioned into one or several slices. The values of the samples in the area of the picture that a slice represents may be properly decoded without the use of data from other slices provided that the reference pictures used at the encoder and the decoder are the same and that de-blocking filtering does not use information across slice boundaries. Therefore, entropy decoding and block reconstruction for a slice does not depend on other slices. In particular, the entropy coding state may be reset at the start of each slice. The data in other slices may be marked as unavailable when defining neighborhood availability for both entropy decoding and reconstruction. The slices may be entropy decoded and reconstructed in parallel. No intra prediction and motion-vector prediction is preferably allowed across the boundary of a slice. In contrast, de-blocking filtering may use information across slice boundaries.

Figure 13:
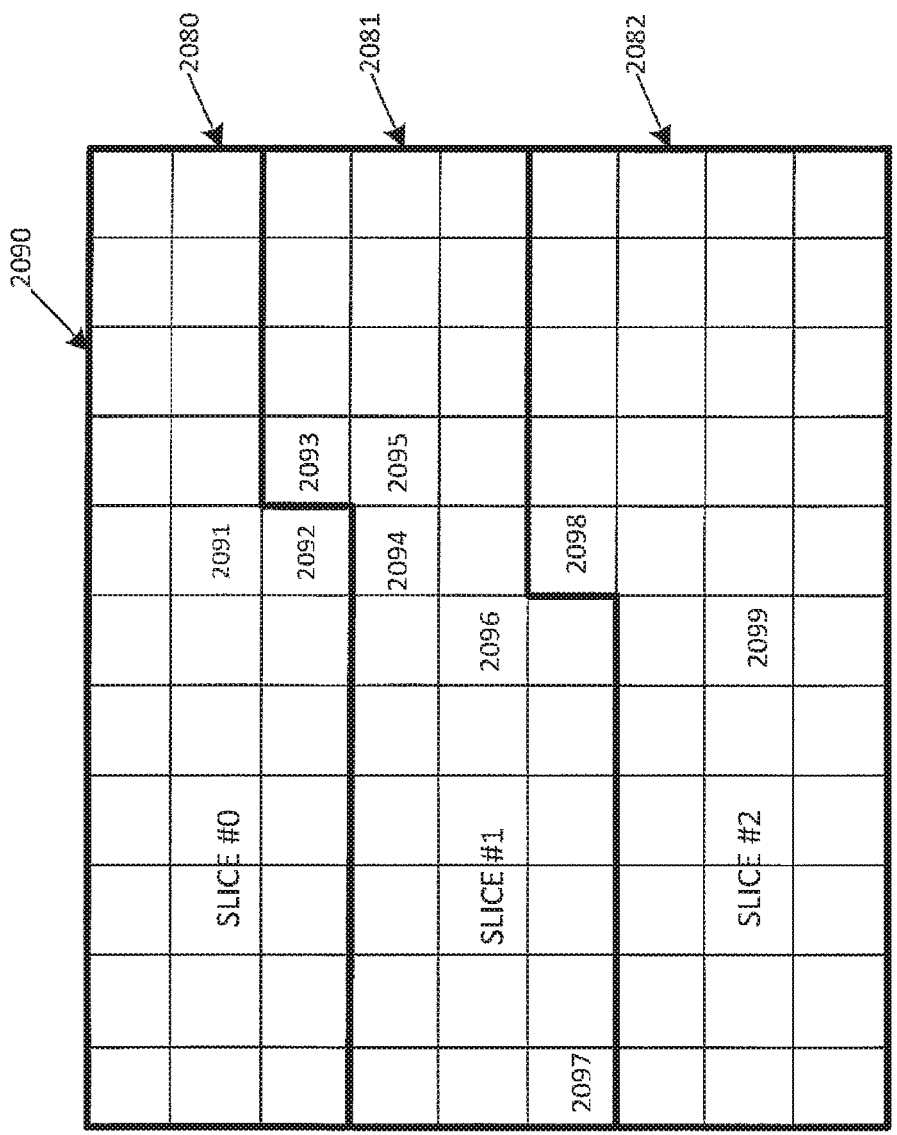
FIG. 13 illustrates an exemplary picture having multiple slices.

FIG. 13 illustrates an exemplary video picture 2090 comprising eleven blocks in the horizontal direction and nine blocks in the vertical direction (nine exemplary blocks labeled 2091-2099). FIG. 13 illustrates three exemplary slices: a first slice denoted "SLICE #0" 2080, a second slice denoted "SLICE #1" 2081 and a third slice denoted "SLICE #2" 2082. The decoder may decode and reconstruct the three slices 2080, 2081, 2082 in parallel. Each of the slices may be transmitted in scan line order in a sequential manner. At the beginning of the decoding/reconstruction process for each slice, context models are initialized or reset and blocks in other slices are marked as unavailable for both entropy decoding and block reconstruction. The context model generally represents the state of the entropy encoder and/or decoder. Thus, for a block, for example, the block labeled 2093, in "SLICE #1," blocks (for example, blocks labeled 2091 and 2092) in "SLICE #0" may not be used for context model selection or reconstruction. Whereas, for a block, for example, the block labeled 2095, in "SLICE #1," other blocks (for example, blocks labeled 2093 and 2094) in "SLICE #1" may be used for context model selection or reconstruction. Therefore, entropy decoding and block reconstruction proceeds serially within a slice. Unless slices are defined using a flexible block ordering (FMO), blocks within a slice are processed in the order of a raster scan.

Flexible block ordering defines a slice group to modify how a picture is partitioned into slices. The blocks in a slice group are defined by a block-to-slice-group map, which is signaled by the content of the picture parameter set and additional information in the slice headers. The block-to-slice-group map consists of a slice-group identification number for each block in the picture. The slice-group identification number specifies to which slice group the associated block belongs. Each slice group may be partitioned into one or more slices, wherein a slice is a sequence of blocks within the same slice group that is processed in the order of a raster scan within the set of blocks of a particular slice group. Entropy decoding and block reconstruction proceeds serially within a slice group.

Figure 14:
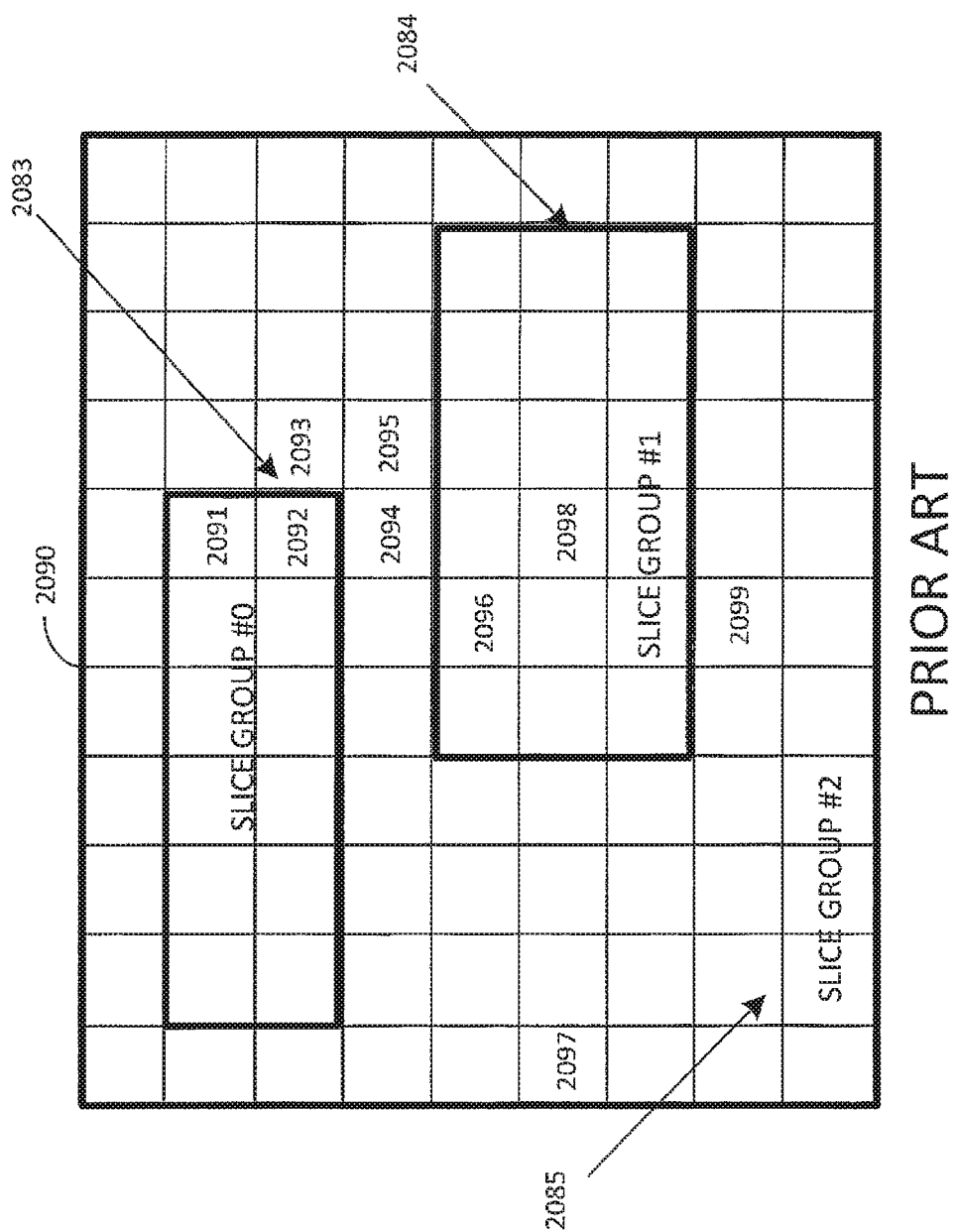
FIG. 14 illustrates another exemplary picture having multiple slices

FIG. 14 depicts an exemplary block allocation into three slice groups: a first slice group denoted "SLICE GROUP #0" 2083, a second slice group denoted "SLICE GROUP #1" 2084 and a third slice group denoted "SLICE GROUP #2" 2085. These slice groups 2083, 2084, 2085 may be associated with two foreground regions and a background region, respectively, in the picture 2090.

The arrangement of slices, as illustrated in FIG. 14, may be limited to defining each slice between a pair of blocks in the image scan order, also known as raster scan or a raster scan order. This arrangement of scan order slices is computationally efficient but does not tend to lend itself to the highly efficient parallel encoding and decoding. Moreover, this scan order definition of slices also does not tend to group smaller localized regions of the image together that are likely to have common characteristics highly suitable for coding efficiency. The arrangement of slices 2083, 2084, 2085, as illustrated in FIG. 14, is highly flexible in its arrangement but does not tend to lend itself to high efficient parallel encoding or decoding. Moreover, this highly flexible definition of slices is computationally complex to implement in a decoder.

Figure 15:
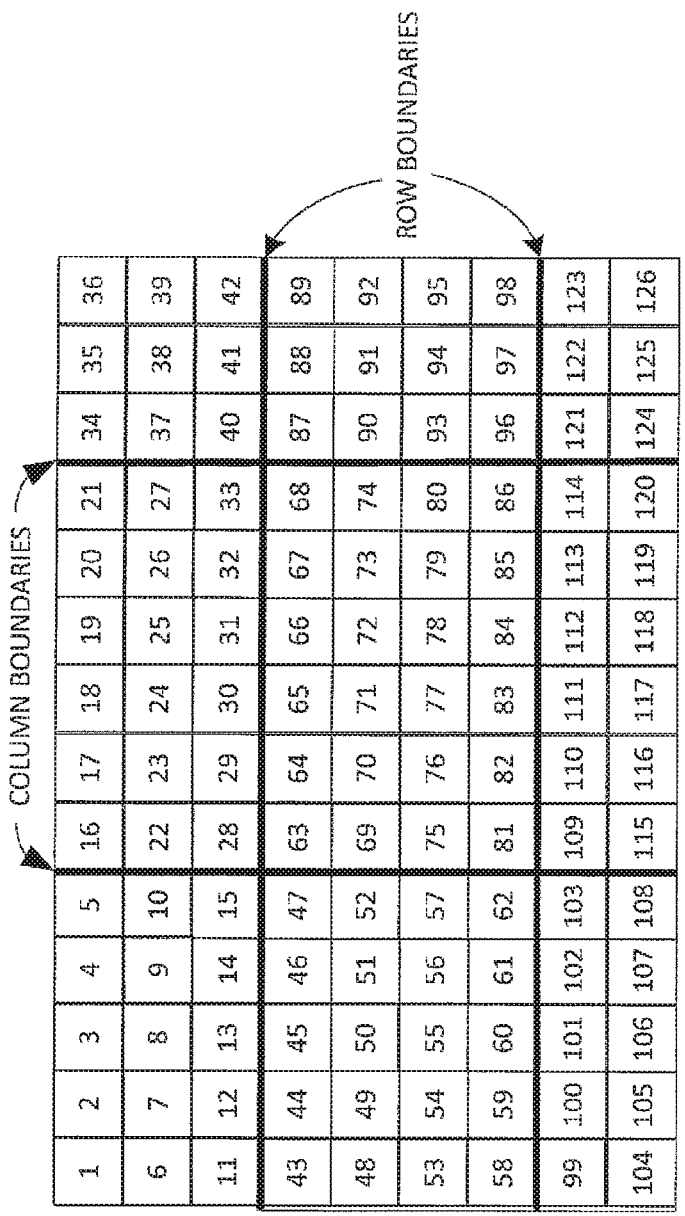
FIG. 15 illustrates a picture with column and row boundaries.

Referring to FIG. 15, a tile technique divides an image into a set of rectangular (inclusive of square) regions. The blocks (alternatively referred to as largest coding units or coded treeblocks in some systems) within each of the tiles are encoded and decoded in a raster scan order. The arrangement of tiles are likewise encoded and decoded in a raster scan order. Accordingly, there may be any suitable number of column boundaries (e.g., 0 or more) and there may be any suitable number of row boundaries (e.g., 0 or more). Thus, the frame may define one or more slices, such as the one slice illustrated in FIG. 15. In some embodiments, blocks located in different tiles are not available for intra-prediction, motion compensation, entropy coding context selection or other processes that rely on neighboring block information.

Figure 16:
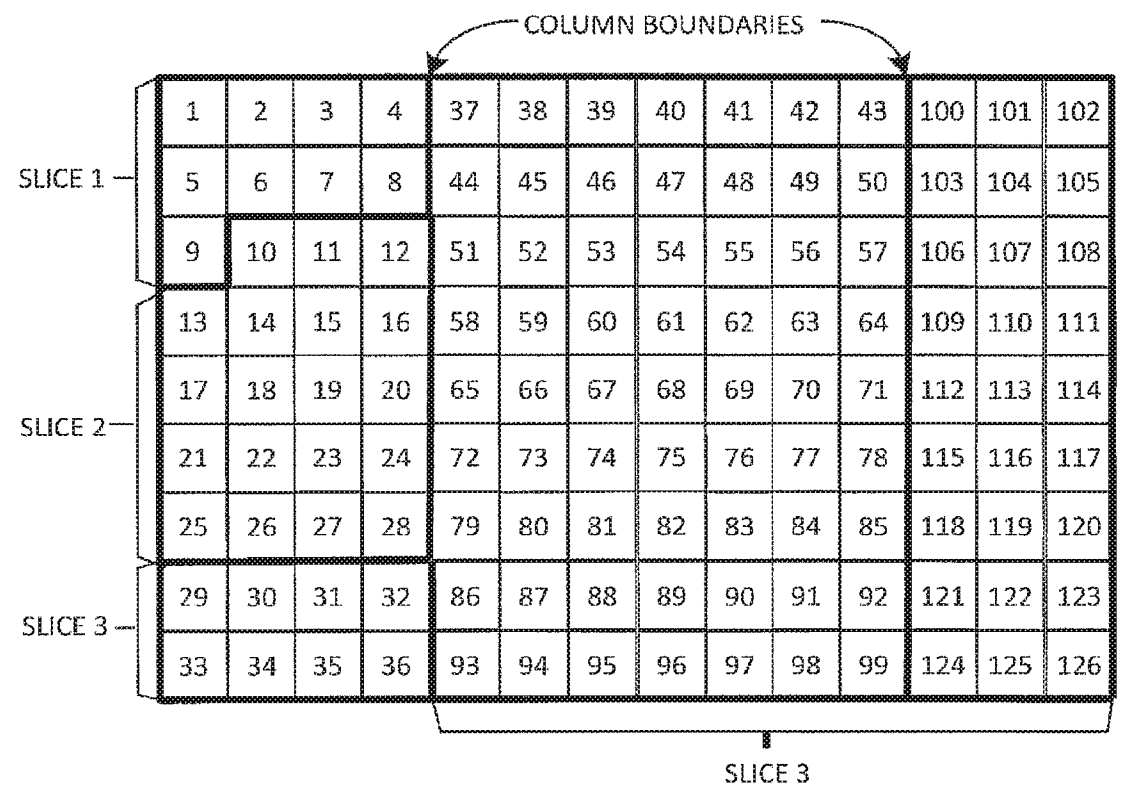

Referring to FIG. 16, the tile technique is shown dividing an image into a set of three rectangular columns. The blocks (alternatively referred to as largest coding units or coded treeblocks in some systems) within each of the tiles are encoded and decoded in a raster scan order. The tiles are likewise encoded and decoded in a raster scan order. One or more slices may be defined in the scan order of the tiles. Each of the slices are independently decodable. For example, slice 1 may be defined as including blocks 1-9, slice 2 may be defined as including blocks 10-28, and slice 3 may be defined as including blocks 29-126 which spans three tiles. The use of tiles facilitates coding efficiency by processing data in more localized regions of a frame.

Figure 17:
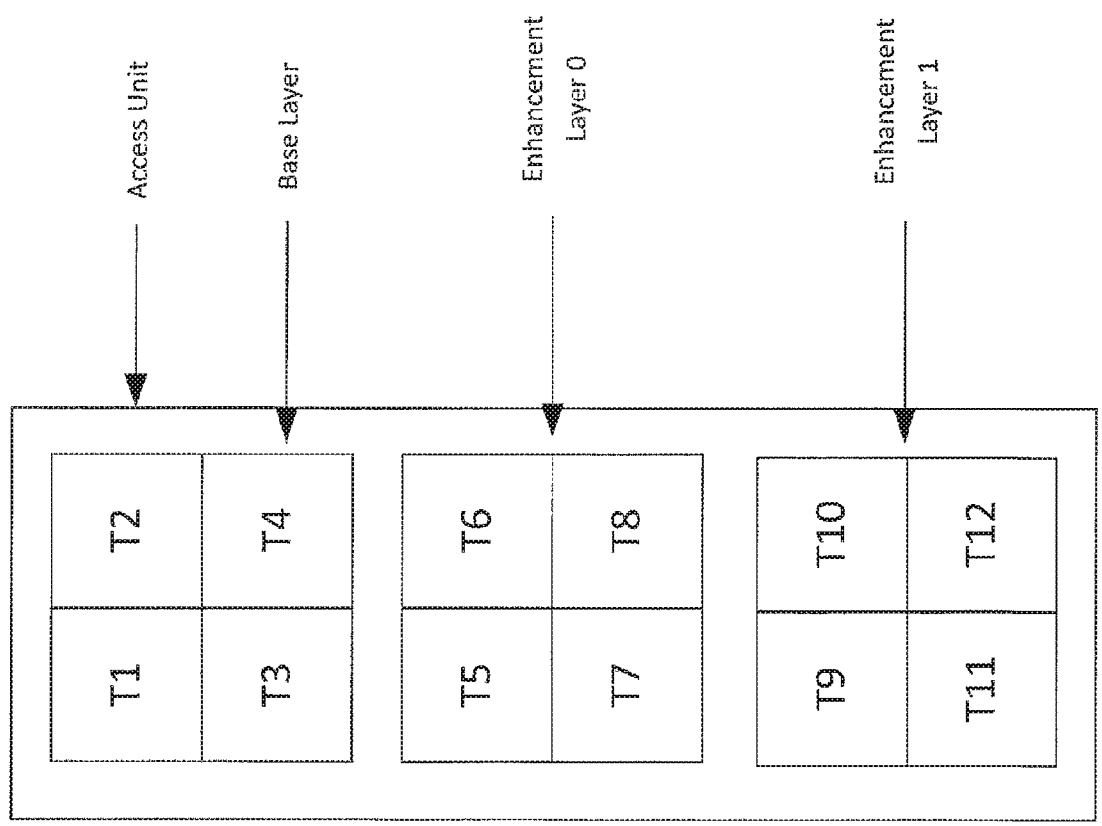
FIG. 17 illustrates an access unit with a base layer, enhancement layers, and tiles.
Figures 18D, 19:
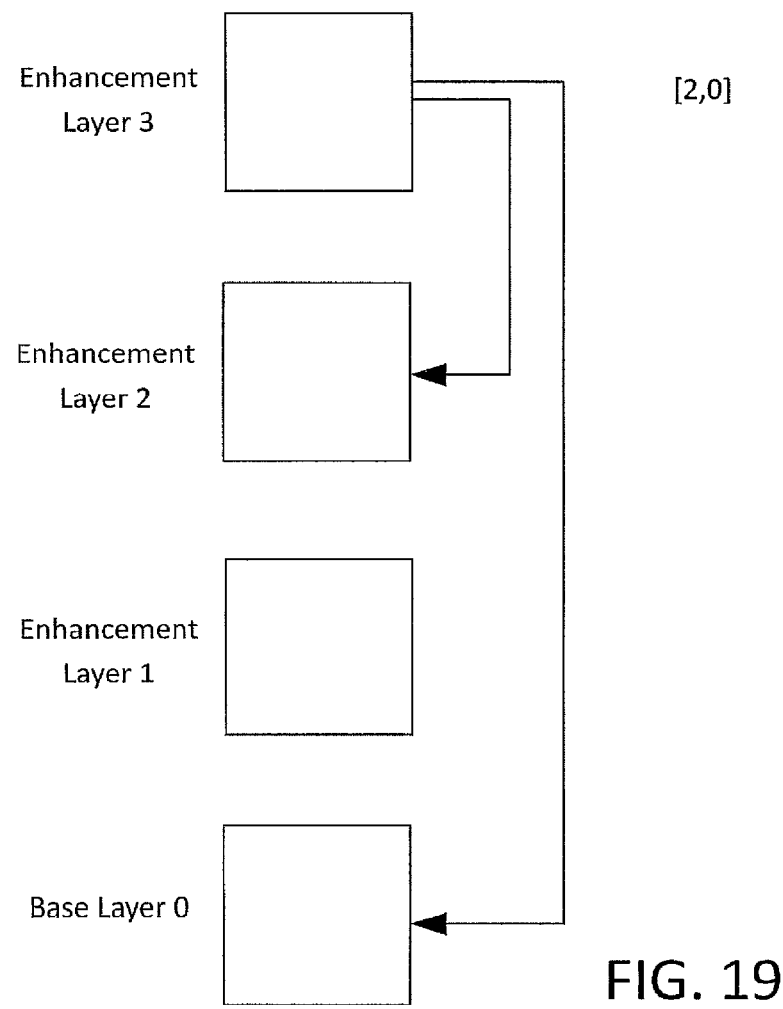
FIG. 18D illustrates an exemplary slice segment header syntax.
FIG. 19 illustrates a base layer and enhancement layers.

Referring to FIG. 17, the base layer and the enhancement layers may each include tiles which each collectively form a picture or a portion thereof. The coded pictures from the base layer and one or more enhancement layers may collectively form an access unit. The access unit may be defined as a set of NAL units that are associated with each other according to a specified classification rule, are consecutive in decoding order, and/or contain the VCL NAL units of all coded pictures associated with the same output time (picture order count or otherwise) and their associated non-VCL NAL units. The VCL NAL is the video coding layer of the network abstraction layer. Similarly, the coded picture may be defined as a coded representation of a picture comprising VCL NAL units with a particular value of nuh_layer_id within an access unit and containing all coding tree units of the picture. Additional descriptions are described in B. Bros, W-J. Han, J-R. Ohm, G. J. Sullivan, and T. Wiegand, "High efficiency video coding (HEVC) text specification draft 10," JCTVC-L1003, Geneva, January 2013; J. Chen, J. Boyce, Y. Ye, M. M. Hannuksela, "SHVC Draft Text 2," JCTVC-M1008, Incheon, May 2013; G. Tech, K. Wegner, Y. Chen, M. Hannuksela, J. Boyce, "MV-HEVC Draft Text 4 (ISO/IEC 23008-2:201x/PDAM2)," JCT3V-D1004, Incheon, May 2013; each of which is incorporated by reference herein in its entirety.

Referring to FIGS. 18A-18D, each slice may include a slice segment header. In some cases a slice segment header may be called slice header. Within the slice segment header there includes syntax elements that are used for inter-layer prediction. This inter-layer prediction defines what other layers the slice may depend upon. In other words this inter-layer prediction defines what other layers the slice may use as its reference layers. The reference layers may be used for sample prediction and/or for motion filed prediction. Referring to FIG. 19 by way of example, enhancement layer 3 may depend upon enhancement layer 2, and base layer layer 0. This dependency relationship may be expressed in the form of a list, such as, [2, 0].

The he NumDirectRefLayers for a layer may be derived based upon a direct_dependency_flag[i][j] that when equal to 0 specifies that the layer with index j is not a direct reference layer for the layer with index i. The direct_dependency_flag[i][j] equal to 1 specifies that the layer with index j may be a direct reference layer for the layer with index i. When direct_dependency_flag[i][j] is not present for i and j in the range of 0 to vps_max_layers_minus1, it is inferred to be equal to 0.

The variables NumDirectRefLayers[i], RefLayerId[i][j] SamplePredEnabledFlag[i][j], MotionPredEnabledFlag[i][j] and DirectRefLayerIdx[i][j] may be derived as follows:

```
for( i = 0; i <= vps_max_layers_minus1; i++ ) {
    iNuhLId = layer_id_in_nuh[ i ]
    NumDirectRefLayers[ iNuhLId ] = 0
        for( j = 0; j < i; j++ )
            if( direct_dependency_flag[ i ][ j ] ) {
                RefLayerId[ iNuhLId ][ NumDirectRefLayers[
                    iNuhLId ]++ ] =
layer_id_in_nuh[ j ]
                SamplePredEnabledFlag[ iNuhLId ][ j ] =
( ( direct_dependency_type[ i ][ j ] + 1 ) & 1 )
                MotionPredEnabledFlag[ iNuhLId ][ j ] =
( ( ( direct_dependency_type[ i ][ j ] + 1 ) & 2 ) >> 1 )
                DirectRefLayerIdx[ iNuhLid ][
                    layer_id_in_nuh[ j ] ] =
NumDirectRefLayers[ iNuhLId ] − 1   }
}
```

The direct_dep_type_len_minus2 plus 2 specifies the number of bits of the direct_dependency_type[i][j] syntax element. In bitstreams conforming to this version of this Specification the value of direct_dep_type_len_minus2 shall be equal 0. Although the value of direct_dep_type_len_minus2 shall be equal to 0 in this version of this Specification, decoders shall allow other values of direct_dep_type_len_minus2 in the range of 0 to 30, inclusive, to appear in the syntax.

The direct_dependency_type[i][j] indicates the type of dependency between the layer with nuh_layer_id equal layer_id_in_nuh[i] and the layer with nuh_layer_id equal to layer_id_in_nuh[j]. direct_dependency_type[i][j] equal to 0 indicates that the layer with nuh_layer_id equal to layer_id_in_nuh[j] is used for inter-layer sample prediction but not for inter-layer motion prediction of the layer with nuh_layer_id equal layer_id_in_nuh[i]. direct_dependency_type[i][j] equal to 1 indicates that the layer with nuh_layer_id equal to layer_id_in_nuh[j] is used for inter-layer motion prediction but not for inter-layer sample prediction of the layer with nuh_layer_id equal layer_id_in_nuh[i]. direct_dependency_type[i][j] equal to 2 indicates that the layer with nuh_layer_id equal to layer_id_in_nuh[j] is used for both inter-layer sample motion prediction and inter-layer motion prediction of the layer with nuh_layer_id equal layer_id_in_nuh[i]. Although the value of direct_dependency_type[i][j] shall be in the range of 0 to 2, inclusive, in this version of this Specification, decoders shall allow values of direct_dependency_type[i][j] in the range of 3 to 232-2, inclusive, to appear in the syntax.

The direct_dependency_flag[i][j], direct_dep_type_len_minus2, direct_dependency_type[i][j] are included in the vps_extension syntax illustrated in FIG. 20A and FIG. 20B, which is included by reference in the VPS syntax which provides syntax for the coded video sequence.

It is typically desirable to reduce the number of referenced layers that need to be signaled within the bitstream, and other syntax elements within the slice segment header may be used to effectuate such a reduction. The other syntax elements may include inter_layer_pred_enabled_flag, num_inter_layer_ref_pics_minus1, and/or inter_layer_pred_layer_idc[i]. These syntax elements may be signaled in slice segment header.

The inter_layer_pred_enabled_flag equal to 1 specifies that inter-layer prediction may be used in decoding of the current picture. The inter_layer_pred_enabled_flag equal to 0 specifies that inter-layer prediction is not used in decoding of the current picture. When not present, the value of inter_layer_pred_enabled_flag is inferred to be equal to 0.

The num_inter_layer_ref_pics_minus1 plus 1 specifies the number of pictures that may be used in decoding of the current picture for inter-layer prediction. The length of the num_inter_layer_ref_pics_minus1 syntax element is Ceil (Log 2(NumDirectRefLayers[nuh_layer_id])) bits. The value of num_inter_layer_ref_pics_minus1 shall be in the range of 0 to NumDirectRefLayers[nuh_layer_id]−1, inclusive.

The variable NumActiveRefLayerPics is derived as follows:

```
if( nuh_layer_id = = 0 | | NumDirectRefLayers[
nuh_layer_id ] = = 0 | | !inter_layer_pred_enabled_flag )
    NumActiveRefLayerPics = 0
else if( max_one_active_ref_layer_flag | | NumDirectRefLayers[
nuh_layer_id ] = = 1 )
    NumActiveRefLayerPics = 1
else
    NumActiveRefLayerPics =
        num_inter_layer_ref_pics_minus1 + 1
```

All slices of a coded picture shall have the same value of NumActiveRefLayerPics.

The inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil(Log 2(NumDirectRefLayers[nuh_layer_id])) bits. The value of inter_layer_pred_layer_idc[i] may be in the range of 0 to NumDirectRefLayers[nuh_layer_id]−1, inclusive. When not present, the value of inter_layer_pred_layer_idc[i] is inferred to be equal to 0.

By way of example, the system may signal various syntax elements especially the direct_dependency_flag[i][j] in VPS which results in the inter-layer reference picture set for layer 3 to be [2, 0]. Then the system may refine further the inter-layer reference picture set with the use of the additional syntax elements for example syntax elements in slice segment header as [2], may refine further the inter-layer reference picture set with the use of the additional syntax elements as [0], or may refine further the interlayer reference picture set with the use of the additional syntax elements as [ ] which is the null set. However, depending on the design of the encoder, the reference picture set of [2, 0] may be signaled as [2, 0].

FIG. 21 shows an exemplary representation format syntax. This may correspond to the rep_format( ) structure in FIG. 20B an exemplary vps extension syntax.

FIG. 22 shows an exemplary VPS Video Usability Information (VUI) syntax. This may correspond to the vps_vui ( ) structure in FIG. 20B and exemplary vps extension syntax.

FIG. 23 shows another exemplary VPS Video Usability Information (VUI) syntax with some differences in syntax compared to FIG. 22. This may correspond to the vps_vui ( ) structure in FIG. 20B and exemplary vps extension syntax.

In FIG. 20B the vps_vui_present_flag equal to 1 specifies that the vps_vui( ) syntax structure is present in the VPS. vps_vui_present_flag equal to 0 specifies that the vps_vui( ) syntax structure is not present in the VPS. vps_vui_alignment_bit_equal_to_one may be equal to 1.

VPS VUI includes syntax elements which indicate inter-layer prediction restrictions. These include syntax elements ilp_restricted_ref_layers_flag, min_spatial_segment_offset_plus1[i][j], ctu_based_offset_enabled_flag[i][j], and min_horizontal_ctu_offset_plus1[i][j]. Essentially depending on spatial segmentation tools used a delay in units of slices, tiles, wavefront coded tree block (CTB) rows with respect to the collocated spatial segment in the reference layer may be signaled. Also based on flag a delay in units of CTBs may be signaled. These inter-layer decoding delay signaling can help parallel decoding of layers, where for a dependent layer instead of waiting for each reference layer to be decoded completely in its entirety before starting its own decoding, the decoding could be started after the indicated delay for each reference layer.

In FIG. 22 syntax elements NumDirectRef1Layers[layer_in_in_nuh[i]] number of {min_spatial_segment_offset_plus1[i][j], ctu_based_offset_enabled_flag[i][j], min_horizontal_ctu_offset_plus1[i][j]} syntax elements are signalled for each direct reference layer for each layer for such delay indication. A signaling optimization for vps vui is shown in FIG. 23 where a common_ilp_offset_params_flag [i] syntax element is signalled. When the common_ilp_offset_params[i] is equal to 1 then instead of signalling syntax elements {min_spatial_segment_offset_plus1[i][j], ctu_based_offset_enabled_flag[i][j], min_horizontal_ctu_offset_plus1[i][j]} individually NumDirectRef1Layers[layer_in_in_nuh[i]] number of times, a common value for those syntax elements is signalled only once and inferred for other layers. In a typical coding scenario using a regular coding structure the inter-layer prediction restriction i.e. inter-layer decoding delay indication values indicated for direct reference layers of a dependent layers will be similar and could be more efficiently signaled using the syntax in FIG. 23 compared to syntax in FIG. 22.

As an example currently if a layer 5 is dependent on layer 0, 1, 2, 3, and 4 and a regular coding structure is used with tiles such that the same values of say {7, 7, 7, 7, 7} are signaled 5 times (once for each of reference layers 0, 1, 2, 3 and 4 of the layer 5) for min_spatial_segment_offset_plus1[i][j] syntax element when using signaling shown in FIG. 22. Instead when using signaling shown in FIG. 23 the flag common_ilp_offset_params_present_flag[i] can be signaled as 1 and value 7 can be signaled for min_spatial_segment_offset_plus1[i][j] only once (instead of 5 times) and can be applied to all the 5 reference layers 0, 1, 2, 3 and 4 of the layer 5.

The ilp_restricted_ref_layers_flag equal to 1 indicates that additional restrictions on inter-layer prediction as specified below apply for each direct reference layer of each layer specified by the VPS. ilp_restricted_ref_layers_flag equal to 0 indicates that additional restrictions on inter-layer prediction may or may not apply.

The variables refCtb Log 2SizeY[i][j], refPicWidthInCtbsY[i][j], and ref-PicHeightInCtbsY[i][j] are set equal to Ctb Log 2SizeY, PicWidthInCtbsY, and PicHeightInCtbsY, respectively, of the j-th direct reference layer of the i-th layer.

The common_ilp_offset_params_present_flag[i] equal to 0 specifies that min_spatial_segment_offset_plus1[i][j], ctu_based_offset_enabled_flag[i][j], min_horizontal_ctu_offset_plus1[i][j] are present for NumDirectRefLayers[layer_id_in_nuh[i]] layers for the i-th layer. common_ilp_offset_params_present_flag[i] equal to 1 specifies that the values of min_spatial_segment_offset_plus1[i][0], ctu_based_offset_enabled_flag[i][0], and when present min_horizontal_ctu_offset_plus1[i][0] apply to all NumDirectRefLayers[layer_id_in_nuh[i]] layers for the i-th layer.

The min_spatial_segment_offset_plus1[i][j] indicates the spatial region, in each picture of the j-th direct reference layer of the i-th layer, that is not used for inter-layer prediction for decoding of any picture of the i-th layer, by itself or together with min_horizontal_ctu_offset_plus1[i][j], as specified below. The value of min_spatial_segment_offset_plus1[i][j] shall be in the range of 0 to refPicWidthInCtbsY[i][j] *refPicHeightInCtbsY[i][j], inclusive. When not present, if common_ilp_offset_params_present_flag[i] is equal to 1 the value of min_spatial_segment_offset_plus1[i][j] if is inferred to be equal to min_spatial_segment_offset_plus1[i][j] otherwise the value of min_spatial_segment_offset_plus1[i][j] is inferred to be equal to 0.

The ctu_based_offset_enabled_flag[i][j] equal to 1 specifies that the spatial region, in units of CTUs, in each picture of the j-th direct reference layer of the i-th layer, that is not used for inter-layer prediction for decoding of any picture of the i-th layer is indicated by min_spatial_segment_offset_plus1[i][j] and min_horizontal_ctu_offset_plus1[i][j] together. ctu_based_offset_enabled_flag[i][j] equal to 0 specifies that the spatial region, in units of slice segments, tiles, or CTU rows, in each picture of the j-th direct reference layer of the i-th layer, that is not used for inter-layer prediction for decoding of any picture of the i-th layer is indicated by min_spatial_segment_offset_plus1[i] only. When not present, if common_ilp_offset_params_present_flag[i] is equal to 1 the value of ctu_based_offset_enabled_flag [i][j] if is inferred to be equal to ctu_based_offset_enabled_flag [i][j] otherwise the value of ctu_based_offset_enabled_flag[i] is inferred to be equal to 0.

The min_horizontal_ctu_offset_plus1[i][j], when ctu_based_offset_enabled_flag[i][j] is equal to 1, indicates the spatial region, in each picture of the j-th direct reference layer of the i-th layer, that is not used for inter-layer prediction for decoding of any picture of the i-th layer, together with min_spatial_segment_offset_plus1[i][j], as specified below. The value of min_horizontal_ctu_offset_plus1[i][j] shall be in the range of 0 to refPicWidthInCtbsY[i][j], inclusive.

When ctu_based_offset_enabled_flag[i][j] is equal to 1, the variable minHorizontalCtbOffset[i][j] is derived as follows: minHorizontalCtbOffset[i][j]=(min_horizontal_ctu_offset_plus1[i][j]>0) ?(min_horizontal_ctu_offset_plus1[i][j]−1): (refPicWidthInCtbsY[i][j]−1)

The variables curPicWidthInSamples$_L$[i], curPicHeightInSamples$_L$[i], curCtb Log 2SizeY[i], curPicWidthInCtbsY[i], and curPicHeightInCtbsY[i] are set equal to PicWidthInSamples$_L$, PicHeightInSamples$_L$, Ctb Log 2SizeY, PicWidthInCtbsY, and PicHeightInCtbsY, respectively, of the i-th layer.

The variables refPicWidthInSamples$_L$[i][j], refPicHeightInSamples$_L$[i][j], refCtb Log 2SizeY[i][j], refPicWidthInCtbsY[i][j], and refPicHeightInCtbsY[i][j] are set equal to PicWidthInSamples$_L$, PicHeightInSamplesL, Ctb Log 2SizeY, PicWidthInCtbsY, and PicHeightInCtbsY, respectively, of the j-th direct reference layer of the i-th layer.

The variables curScaledRefLayerLeftOffset[i][j], curScaledRefLayerTopOffset[i][j], curScaledRefLayerRightOffset[i][j] and curScaledRefLayerBottomOffset[i][j] are set equal to scaled_ref_layer_left_offset[j]<<1, scaled_ref_layer_top_offset[j]<<1, scaled_ref_layer_right_offset[j]<<1, scaled_ref_layer_bottom_offset [j]<<1, respectively, of the j-th direct reference layer of the i-th layer.

The variable colCtbAddr[i][j] that denotes the raster scan address of the collocated CTU, in a picture in the j-th direct reference layer of the i-th layer, of the CTU with raster scan address equal to ctbAddr in a picture of the i-th layer is derived as follows:

The variables (xP, yP) specifying the location of the top-left luma sample of the CTU with raster scan address equal to ctbAddr relative to top-left luma luma sample in a picture of the i-th layer are derived as follows:
 xP=(ctbAddr % curPicWidthInCtbsY[i])<<curCtb Log 2SizeY
 yP=(ctbAddr/curPicWidthInCbsY[i])<<cutCtb Log 2SizeY The variables scaleFactorX[i][j] and scaleFactorY[i][j] are derived as follows:
 curScaledRefLayerPicWidthInSamples$_L$[i][j]= curPicWidthInSamples$_L$[i]− curScaledRefLayerLeftOffset[i][j]−curScaledRefLayerRightOffset[i][j]
 curScaledRefLayerPicHeightInSamples$_L$[i][j]=curPicHeightInSamples$_L$[i]− curScaledRefLayerTopOffet[i][j]−curScaledRleLayerBottomOffset[i][j]
 scaleFactorX[i]=((refPicWidthInSamples$_L$[i][j]<<16)+ (curScaleRefLayerPicWidthInSamples$_L$[i][j]>>1))/curScaledRefLayerPicWidthInSamples$_L$[i][j]
 scaleFactorY[i][j]=((refPicWeightInSamples$_L$[i][j]<<16)+ (curScaledRefLayerPicHeightInSamples$_L$>>1))/ curScaledRefLayerPicHeightInSamples$_L$[i][j]

The variables (xCol[I][j], yCol xCol[I][j]) specifying the collocated luma sample location in a picture in the j-th direct reference layer of the luma sample location (xP, yP) in the i-th layer are derived as follows.

```
xCol [ i ][ j ] = Clip3( 0, ( refPicWidthInSamples_L[ i ][ j ]– 1 ),
( ( xP − curScaledRefLayerLeftOffset[ i ][ j ]) * scaleFactorX[ i ][ j ] +
( 1 << 15 ) ) >> 16 ))
yCol [ i ][ j ] = Clip3( 0 , ( refPicHeightInSamples_L[ i ][ j ]– 1 ),
( ( yP − curScaledRefLayerTopOffset[ i ][ j ]) * scaleFactorY[ i ][ j ] +
( 1 << 15 ) ) >> 16 ))
```

The variable colCtbAddr[i][j] is derived as follows:
xColCtb[i][j]=xCol[i][j]>>refCtb Log 2SizeY[i][j]
yColCtb[i][j]=yCol[i][j]>>refCtb Log 2SizeY[i][j]
colCtbAddr[i][j]
xColCtb[i][j]+(yColCtb[i][j]*refPicWidthInCtbsY[i][j])

When min_spatial_segment_offset_plus1[i][j] is greater than 0, it is a requirement of bitstream conformance that the following shall apply:
If ctu_based_offset_enabled_flag[i][j] is equal to 0, exactly one of the following applies:
In each PPS referred to by a picture in the j-th direct reference layer of the i-th layer, tiles_enabled_flag is equal to 0 and entropy_coding_sync_enabled_flag is equal to 0, and the following applies:
Let slice segment A be any slice segment of a picture of the i-th layer and ctbAddr be the raster scan address of the last CTU in slice segment A. Let slice segment B be the slice segment that belongs to the same access unit as slice segment A, belongs to the jth direct reference layer of the i-th layer, and contains the CTU with raster scan address colCtbAddr[i][j]. Let slice segment C be the slice segment that is in the same picture as slice segment B and follows slice segment B in decoding order, and between slice segment B and that slice segment there are min_spatial_segment_offset_plus1[i]−1 slice segments in decoding order. When slice segment C is present, the syntax
elements of slice segment A are constrained such that no sample or syntax elements values in slice segment C or any slice segment of the same picture following C in decoding order are used for inter-layer prediction in the decoding process of any samples within slice segment A.

In each PPS referred to by a picture in the j-th direct reference layer of the i-th layer, tiles_enabled_flag is equal to 1 and entropy_coding_sync_enabled_flag is equal to 0, and the following applies:
Let tile A be any tile in any picture picA of the i-th layer and ctbAddr be the raster scan address of the last CTU in tile A. Let tile B be the tile that is in the picture picB belonging to the same access unit as picA and belonging to the j-th direct reference layer of the i-th layer and that contains the CTU with raster scan address colCtbAddr[i][j]. Let tile C be the tile that is also in picB and follows tile B in decoding order, and between tile B and that tile there are min_spatial_segment_offset_plus1[i]−1 tiles in decoding order. When slice segment C is present, the syntax elements of tile A are constrained such that no sample or syntax elements values in tile C or any tile of the same picture following C in decoding order are used for inter-layer prediction in the decoding process of any samples within tile A.

In each PPS referred to by a picture in the j-th direct reference layer of the i-th layer, tiles_enabled_flag is equal to 0 and entropy_coding_sync_enabled_flag is equal to 1, and the following applies:
Let CTU row A be any CTU row in any picture picA of the i-th layer and ctbAddr be the raster scan address of the last CTU in CTU row A. Let CTU row B be the CTU row that is in the picture picB belonging to the same access unit as picA and belonging to the j-th direct reference layer of the i-th layer and that contains the CTU with raster scan address colCtbAddr[i][j]. Let CTU row C be the CTU row that is also in picB and follows CTU row B in decoding order, and between CTU row B and that CTU row there are min_spatial_segment_offset_plus1[i]−1 CTU rows in decoding order. When CTU row C is present, the syntax elements of CTU row A are constrained such that no sample or syntax elements values in CTU row C or row of the same picture following C are used for inter-layer prediction in the decoding process of any samples within CTU row A.

Otherwise (ctu_based_offset_enabled_flag[i][j] is equal to 1), the following applies:
The variable refCtbAddr[i][j] is derived as follows:
xOffset[i][j]=
((xColCtb[i][j]+minHorizontalCtbOffst[i][j])>
  (refPicWidthInCbsY[i
][j]−1))?
(refPicWidthInCtbsY[i][j]−1−xColCtb[i][j]):
(minHorizontalCtbOffset[i][j]
yOffset[i][j]=(min_spatial_segment_offset_plus1[i][j]−
1) refPicWidthInCtbsY[i][j]
refCtbAddr[i][j]=
colCtbAddr[i][j]+xOffset[i][j]+yOffset[i][j]

Let CTU A be any CTU in any picture picA of the i-th layer, and ctbAddr be the raster scan address ctbAddr of CTU A. Let CTU B be a CTU that is in the picture belonging to the same access unit as picA and belonging to the j-th direct reference layer of the i-th layer and that has raster scan address greater than refCtbAddr[i][j]. When CTU B is present, the syntax elements of CTU A are constrained such that no sample or syntax elements values in CTU B are used for inter-layer prediction in the decoding process of any samples within CTU A.

Additional descriptions of HEVC, SHVC and MV-HEVC video coding are described in B. Bros, W.-J. Han, J.-R. Ohm, G. J. Sullivan, and T. Wiegand, "High efficiency video coding (HEVC) text specification draft 10," JCTVC-L1003, Geneva, January 2013; G. Tech, K. Wegner, Y. Chen, M. Hannuksela, J. Boyce, "MV-HEVC Draft Text 7 (ISO/IEC 23008-2:201x/PDAM2)," JCT3V-G1004, San Jose, January 2014; each of which is incorporated by reference herein in its entirety. J. Chen, J. Boyce, Y. Ye, M. M. Hannuksela, "High Efficiency Video Coding (HEVC) Scalable Extension Draft 5", JCTVC-P1008, San Jose, January 2014, is incorporated by reference herein in its entirety.

FIG. 24A illustrates an exemplary video parameter set (VPS) syntax. In one embodiment the VPS syntax shown in FIG. 24A may be carried inside a HEVC coded video bitstream. FIG. 24B illustrates an exemplary video parameter set (VPS) syntax. In one embodiment the VPS syntax shown in FIG. 24B may be carried inside a SHVC and/or MV-HEVC coded video bitstream. VPS may include a VPS extension -vps_extension syntax FIG. 25 illustrates an exemplary video parameter set (VPS) extension syntax. VPS extension may include a vps video usability information syntax structure. FIG. 26 illustrates an exemplary vps video usability information (VPS VUI) syntax FIG. 27 illustrates an exemplary sequence parameter set (SPS) extension syntax. SPS may include a sps video usability information syntax structure. FIG. 28 illustrates an exemplary sps video usability information (SPS VUI)

FIG. 29 illustrates an exemplary profile_tier_level syntax structure. In one embodiment the profile_tier_level syntax structure as shown in FIG. 28 may be carried in VPS and SPS of a video coded according to HEVC International standard specification.

FIG. 30 illustrates an exemplary profile_tier_level syntax. In one embodiment the profile_tier_level syntax structure as shown in FIG. 28 may be carried in VPS and SPS of a video coded according to SHVC and/or MV-HEVC International standard specification. In particular the profile_tier_level may be carried in the VPS as shown in FIG. 24 and The profile_tier_level( ) syntax structure provides profile, tier and level information used for a layer set. When the profile_tier_level( ) syntax structure is included in a vps_extension( ) syntax structure, the applicable layer set to which the profile_tier_level( ) syntax structure applies is specified by the corresponding lsIdx variable in the vps_extension( ) syntax structure. When the profile_tier_level( ) syntax structure is included in a VPS, but not in a vps_extension( ) syntax structure, the applicable layer set to which the profile_tier_level( ) syntax structure applies is the layer set specified by the index 0. When the profile_tier_level( ) syntax structure is included in an SPS, the layer set to which the profile_tier_level( ) syntax structure applies is the layer set specified by the index 0.

It is desirable to have additional constraints on coded video. In one embodiment the coded video may be carried in video subsystem of digital television standards. Particular constraints on coded video may be carried in video subsystem of ATSC 3.0 standard and other standards.

The additional constraints may be suitable for the carriage of HEVC video in ATSC.

Additional constraints may be suitable for carriage of SHVC video in ATSC.

Thus the constraints are preferably applicable if either HEVC and/or SHVC are selected as video codec for carriage of coded video in video subsystem of ATSC 3.0 standard.

Constraints may include, for example, any of the following syntax elements for both HEVC and SHVC coded video carried in ATSC 3.0 video subsystem:

Constraints are defined on general_progressive_source_flag, general_interlaced_source_flag and general_frame_only_constraint_flag in profile_tier_level syntax structure in Sequence Parameter Set (SPS) and Video Parameter Set (VPS). These constraints make sure that only progressive source scan pictures are in the coded video bitstream.

Constraints on vui_parameters_present_flag, field_seq_flag and frame_field_info_present_flag in Sequence Parameter Set (SPS). These constraints make sure that SPS VUI parameters are signalled in the bitstream and that only progressive source scan pictures are in the coded video bitstream.

Constraints on vui_parameters_present_flag, vui_timing_info_preset_flag vui_parameters_present_flag, fixed_pic_rate_general_flag[i] and fixed_pic_rate_within_cvs_flag [i] in SPS. These constraints make sure that only fixed picture rate (fixed frame rate) is allowed in the coded video bitstream.

The following constraints may be included for SHVC coded video carried in ATSC 3.0 video subsystem Constraints on vps_extension_flag. This makes sure vps_extension( ) is present in the video bitstream.

Constraints on general_progressive_source_flag, general_interlaced_source_flag and general_frame_only_constraint_flag in profile_tier_level syntax structure in vps_extension( ). These constraints make sure that only progressive source scan pictures are in the coded video bitstream.

Constraints on vps_vui_present_flag, pic_rate_present_vps_flag, pic_rate_present_flag[i][j] and constant_pic_rate_idc[i][j]. These constraints make sure that VPS VUI parameters are signalled in the bitstream and that only progressive source scan pictures are in the coded video.

Constraints on vui_parameters_present_flag, vui_timing_info_present_flag_vui_hrd_parameters_present_flag, fixed_pic_rate_general_flag[i] and fixed_pic_rate_within_cvs_flag [i] in VPS and vps_extension( ). These constraints make sure that only fixed picture rate (fixed frame rate) is allowed in the coded video bitstream.

It is preferable that only progressive source scan type is supported for pictures in the coded video to be carried in the video subsystem with no support for interlaced source scan type. The preferable bitstream constraints correspond to this restriction which only allows progressive scan type pictures to be coded and do not allow interlaced source scan type pictures to be coded in the video bitstream carried in the video subsystem.

It is also preferable that only fixed picture rate is supported and that base layer and enhancement layer have the same picture rate. Both integer and fractional picture rates may be supported. The term picture rate and frame rate may be used interchangeably. Carrying coded video which does not have fixed picture rate or fixed frame rate may not provide any benefits but may hamper viewer experience as human visual system has to adjust between content with different picture rate or different frame rate. The preferable bitstream constraints correspond to this restriction, which only allows fixed picture rate. The preferable bitstream constraints may further impose a restriction which required the base layer and enhancement layer to have the same fixed picture rate or fixed frame rate.

The following constraints are preferable for both HEVC and SHVC coded video carried in ATSC 3.0 video subsystem:

general_progressive_source_flag and general_interlaced_source_flag may be interpreted as follows:

If general_progressive_source_flag is equal to 1 and general_interlaced_source_flag is equal to 0, the source scan type of the pictures in the CVS should be interpreted as progressive only.

Otherwise, if general_progressive_source_flag is equal to 0 and general_interlaced_source_flag is equal to 1, the source scan type of the pictures in the CVS should be interpreted as interlaced only.

Otherwise, if general_progressive_source_flag is equal to 0 and general_interlaced_source_flag is equal to 0, the source scan type of the pictures in the CVS should be interpreted as unknown or unspecified.

Otherwise (general_progressive_source_flag is equal to 1 and general_interlaced_source_flag is equal to 1), the source scan type of each picture in the CVS is indicated at the picture level using the syntax element source_scan_type in a picture timing SEI message.

Decoders may ignore the values of general_progressive_source_flag and general_interlaced_source_flag for purposes other than determining the value to be inferred for frame_field_info_present_flag when vui_parameters_present_flag is equal to 0, as there are no other decoding process requirements associated with the values of these flags. Moreover, the actual source scan type of the pictures may be any suitable type, and the method by which the encoder selects the values of general_progressive_source_flag and general_interlaced_source_flag may be unspecified.

In one embodiment general_progressive_source_flag in profile_tier_level syntax structure in Sequence Parameter Set (SPS) and Video Parameter Set (VPS) is required to be set equal to 1. Thus it will be a requirement of the bitstream conformance for the coded video bitstream that general_progressive_source_flag in profile_tier_level syntax structure in Sequence Parameter Set (SPS) and Video Parameter Set (VPS) is required to be set equal to value 1

In one embodiment general_interlaced_source_flag flag in profile_tier_level syntax structure in Sequence Parameter Set (SPS) and Video Parameter Set (VPS) is required to be set equal to 0. Thus it is a requirement of the bitstream conformance for the coded video bitstream that general_interlaced_source_flag in profile_tier_level syntax structure in Sequence Parameter Set (SPS) and Video Parameter Set (VPS) is required to be set equal to value 0.

general_frame_only_constraint_flag equal to 1 specifies that field_seq_flag is equal to 0. general_frame_only_constraint_flag equal to 0 indicates that field_seq_flag may or may not be equal to 0.

Decoders may ignore the value of general_frame_only_constraint_flag, as there are no decoding process requirements associated with the value of field_seq_flag.

When general_progressive_source_flag is equal to 1, general_frame_only_constraint_flag may or may not be equal to 1.

In one embodiment general_frame_only_constraint_flag in profile_tier_level syntax structure in Sequence Parameter Set (SPS) and Video Parameter Set (VPS) is required to be set equal to 1. Thus it is a requirement of the bitstream conformance for the coded video bitstream that general_frame_only_constraint_flag in profile_tier_level syntax structure in Sequence Parameter Set (SPS) and Video Parameter Set (VPS) is required to be set equal to value 1.

vui_parameters_present_flag equal to 1 may specify that the vui_parameters( ) syntax structure is present. An exemplary vui_parameters( ) syntax structure is shown in FIG. 28. vui_parameters_present_flag equal to 0 specifies that the vui_parameters( ) syntax structure as specified in Annex E is not present.

field_seq_flag equal to 1 may indicate that the coded video sequence conveys pictures that represent fields, and specifies that a picture timing SEI message shall be present in every access unit of the current CVS. field_seq_flag equal to 0 may indicate that the CVS conveys pictures that represent frames and that a picture timing SEI message may or may not be present in any access unit of the current CVS. When field_seq_flag is not present, it is inferred to be equal to 0. When general_frame_only_constraint_flag is equal to 1, the value of field_seq_flag shall be equal to 0.

The specified decoding process does not treat access units conveying pictures that represent fields or frames differently. A sequence of pictures that represent fields would therefore be coded with the picture dimensions of an individual field. For example, access units containing pictures that represent 1080i fields would commonly have cropped output dimensions of 1920×540, while the sequence picture rate would commonly express the rate of the source fields (typically between 50 and 60 Hz), instead of the source frame rate (typically between 25 and 30 Hz).

frame_field_info_present_flag equal to 1 may specify that picture timing SEI messages are present for every picture and include the pic_struct, source_scan_type, and duplicate_flag syntax elements. frame_field_info_present_flag equal to 0 may specify that the pic_struct syntax element is not present in picture timing SEI messages.

When frame_field_info_present_flag is present and either or both of the following conditions are true, frame_field_info_present_flag shall be equal to 1:
 field_seq_flag is equal to 1.
 general_progressive_source_flag is equal to 1 and general_interlaced_source_flag is equal to 1.

When frame_field_info_present_flag is not present, its value is inferred as follows:
 If general_progressive_source_flag is equal to 1 and general_interlaced_source_flag is equal to 1, frame_field_info_present_flag is inferred to be equal to 1.
 Otherwise, frame_field_info_present_flag is inferred to be equal to 0.

In one variant embodiment: If vui_parameters_present_flag in SPS is equal to 1 then it is required that field_seq_flag is set equal to 0 and frame_field_info_present_flag is set equal to 0. Thus it is a requirement of the bitstream conformance for the coded video bitstream that if vui_parameters_present_flag in SPS is equal to 1 then it is required that field_seq_flag is set equal to 0 and frame_field_info_present_flag is set equal to 0.

In another variant embodiment: vui_parameters_present_flag in SPS is required to be set to 1 and it is required that field_seq_flag is set equal to 0 and frame_field_info_present_flag is set equal to 0. Thus it is a requirement of the bitstream conformance for the coded video bitstream that vui_parameters_present_flag in SPS is required to be set to 1 and it is required that field_seq_flag is set equal to 0 and frame_field_info_present_flag is set equal to 0.

vui_timing_info_present_flag equal to 1 may specify that vui_num_units_in_tick, vui_time_scale, vui_poc_proportional_to_timing_flag, and vui_hrd_parameters_present_flag are present in the vui_parameters( ) syntax structure. vui_timing_info_present_flag equal to 0 may specify that vui_num_units_in_tick, vui_time_scale, vui_poc_proportional_to_timing_flag, and vui_hrd_parameters_present_flag are not present in the vui_parameters( ) syntax structure.

vui_hrd_parameters_present_flag equal to 1 may specify that the syntax structure hrd_parameters( ) is present in the vui_parameters( ) syntax structure. vui_hrd_parameters_present_flag equal to 0 may specify that the syntax structure hrd_parameters( ) is not present in the vui_parameters( ) syntax structure.

The hrd_parameters( ) syntax structure provides HRD parameters used in the HRD operations for a layer set. When the hrd_parameters( ) syntax structure is included in a VPS, the applicable layer set to which the hrd_parameters( ) syntax structure applies is specified by the corresponding hrd_layer_set_idx[i] syntax element in the VPS. When the hrd_parameters( ) syntax structure is included in an SPS, the layer set to which the hrd_parameters( ) syntax structure applies is the layer set for which the associated layer identifier list contains all nuh_layer_id values present in the CVS.

fixed_pic_rate_general_flag[i] equal to 1 may indicate that, when HighestTid is equal to i, the temporal distance between the HRD output times of consecutive pictures in output order is constrained as specified below. fixed_pic_rate_general_flag[i] equal to 0 may indicate that this constraint may not apply.

When fixed_pic_rate_general_flag[i] is not present, it may be inferred to be equal to 0.

fixed_pic_rate_within_cvs_flag[i] equal to 1 may indicate that, when HighestTid is equal to i, the temporal distance between the HRD output times of consecutive pictures in output order is constrained as specified below. fixed_pic_rate_within_cvs_flag[i] equal to 0 may indicate that this constraint may not apply.

When fixed_pic_rate_general_flag[i] is equal to 1, the value of fixed_pic_rate_within_cvs_flag[i] may be inferred to be equal to 1.

maxNumSubLayersMinus1 may be a parameter indicating the maximum number of temporal sub-layers.

The variable HighestTid, which identifies the highest temporal sub-layer to be decoded, may be specified as follows:
- If some external moans, not specified in HEVC International standard specification, is available to set HighestTid, HighestTid is set by the external means.
- Otherwise, if the decoddmg process is invoked in a bitstream conformance test as specified in subclause C.1 of HEVC International standard specification, HighestTid is set as specified in subclause C.1 of HEVC International standard specification.
- Otherwise, HighestTid is set equal to sps_max_sub_layers_minus1.

sps_max_sub_layers_minus1 plus 1 may specify the maximum number of temporal sub-layers that may be present in each CVS referring to the SPS. The value of sps_max_sub_layers_minus1 shall be in the range of 0 to 6, inclusive. The value of sps_max_sub_layers_minus1 may be less than or equal to vps_max_sub_layers_minus1.

vps_max_sub_layers_minus1 plus 1 may specify the maximum number of temporal sub-layers that may be present in each CVS referring to the VPS. The value of vps_max_sub_layers_minus1 may be in the range of 0 to 6, inclusive.

In one embodiment vui_parameters_present_flag in SPS is required to be set to equal to 1, vui_timing_info_present_flag in SPS is required to be set equal to 1, vui_hrd_parameters_present_flag in SPS is required to be set equal to 1, and additionally:
- in one variant embodiment: fixed_pic_rate_general_flag[i] is required to be set equal to 1 or fixed_pic_rate_within_cvs_flag [i] is required to be act equal to 1 for all value of i in the range 0 to maxNmnSubLayerMinus1, inclusive.
- in another variant embodiment: fixed_pic_rate_general_flag[i] is required to be set equal to 1 or fixed_pic_rate_within_cvs_flag [i] is required to be set equal to 1 for i equal to maxNumSubLayersMinus1.

Thus it will be a requirement of the bitstream conformance for the coded video bitstream that vui_parameters_present_flag in SPS is required to be set to equal to 1, vui_timing_info_present_flag in SPS is required to be set equal to 1, vui_hrd_parameters_present_flag in SPS is required to be set equal to 1, and additionally:
- in one variant embodiment it will be a requirement of the bitstream conformance for the coded video bitstream that fixed_pic_rate_general_flag[i] is required to be set equal to 1 or fixed_pic_rate_within_cvs_flag [i] is requited to be set equal to 1 for all value of i in the range 0 to maxNumSubLayersMinus1, inclusive.
- in another variant embodiment it will be a requirement of the bitstream conformance for the coded video bitstream that fixed_pic_rate_general_flag[i] s required to be set equal to 1 or fixed_pic_rate_within_cvs_flag [i] is required to be set equal to 1 for i equal to maxNumSubLayersMinus1.

Following constraints are additionally proposed for SHVC coded video carried in ATSC 3.0 video subsystem. Thus when SHVC coded video is carried in ATSC 3.0 video subsystem all the constraints specified above and below are mandated.

vps_extension_flag equal to 0 may specify that no vps_extension( ) syntax structure is present in the VPS RBSP syntax structure. vps_extension_flag equal to 1 may specify that the vps_extension( ) syntax structure is present in the VPS RBSP syntax structure. When MaxLayersMinus1 is greater than 0, vps_extension_flag shall be equal to 1.

vps_max_layers_minus1 plus 1 may specify the maximum allowed number of layers in the CVS. vps_max_layers_minus1 shall be less than 63 in bitstreams conforming to this version of this Specification. The value of 63 for vps_max_layers_minus1 is reserved for future use by ITU-T|ISO/IEC. Although the value of vps_max_layers_minus1 is required to be less than 63 in this version of this Specification, decoders shall allow a value of vps_max_layers_minus1 equal to 63 to appear in the syntax. In a future super multiview coding extension of this specification, the value of 63 for vps_max_layers_minus1 will be used to indicate an extended number
of layers.

The variable MaxLayersMinus1 may be set equal to Min(62, vps_max_layers_minus1). In this document the variable MaxLayersMinus1 and syntax element vps_max_layers_minus1 may be used interchangeably. Both of them maybe used to denote the same thing.

In one embodiment vps_extension_flag is required to be set equal to 1.

Thus it will be a requirement of the bitstream conformance for the coded video bitstream that vps_extension_flag is required to be set equal to 1.

vps_num_profile_tier_level_minus1 plus 1 specifies the number of profile_tier_level( ) syntax structures in the VPS. The value of vps_num_profile_tier_level_minus1 shall be in the range of 0 to 63, inclusive.

profile_level_tier_idx[i] may specifies the index, into the list of profile_tier_level( ) syntax structures in the VPS, of the profile_tier_level( ) syntax structure that applies to i-th output layer set. The length of the profile_level_tier_idx[i] syntax element is Ceil(Log 2(vps_num_profile_tier_level_minus1+1)) bits. The value of
profile_level_tier_idx[0] may be inferred to be equal to 0. The value of profile_level_tier_idx[i] may be in the range of 0 to vps_num_profile_tier_level_minus1, inclusive.

In one embodiment if vps_num_profile_tier_level_minus1 is greater than 0 then for each profile_tier_level( ) syntax structure in vps_extension( ) that applies to layer set to be carried in the video subsystem of this specification as indicated by the profile_tier_level_idx[i]:
- the value of general_progressive_source_flag is required to be set equal to 1,
- the value of general_interlaced_source_flag is required to be set equal to 0 and
- the value of general_frame_only_constraint_flag is required to be set equal to 1.

Thus in one embodiment it will be a requirement of the bitstream conformance for the coded video bitstream if vps_num_profile_tier_level_minus1 is greater than 0 then for each profile_tier_level( ) syntax structure in vps_extension( ) that applies to layer set to be carried in the video subsystem of this specification as indicated by the profile_tier_level_idx[i]:
- the value of general_progressive_source_flag is required to be set equal to 1,
- the value of general_interlaced_source_flag is required to be set equal to 0 and the value of general_frame_only_constraint_flag is required to be set equal to 1.

vps_vui_present_flag equal to 1 may specify that the vps_vui( ) syntax structure is present in the VPS. vps_vui_present_flag equal to 0 may specify that the vps_vui( ) syntax structure is not present in the VPS.

bit_rate_present_vps_flag equal to 1 specifies that the syntax element bit_rate_present_flag[i][j] is present. bit_rate_present_vps_flag equal to 0 specifies that the syntax element bit_rate_present_flag[i][j] is not present.

pic_rate_present_vps_flag equal to 1 specifies that the syntax element pic_rate_present_flag[i][j] is present. pic_rate_present_vps_flag equal to 0 specifies that the syntax element pic_rate_present_flag[i][j] is not present.

bit_rate_present_flag[i][j] equal to 1 specifies that the bit rate information for the j-th subset of the i-th layer set is present. bit_rate_present_flag[i] equal to 0 specifies that the bit rate information for the j-th subset of the i-th layer set is not present. The jth subset of a layer set is the output of the sub-bitstream extraction process when it is invoked with the layer set, j, and the layer identifier list associated with the layer set as inputs. When not present, the value of bit_rate_present_flag[i][j] is inferred to be equal to 0.

pic_rate_present_flag[i][j] equal to 1 specifies that picture rate information for the j-th subset of the i-th layer set is present. pic_rate_present_flag[i][j] equal to 0 specifies that picture rate information for the j-th subset of the i-th layer set is not present. When not present, the value of pic_rate_present_flag[i][j] is inferred to be equal to 0.

avg_bit_rate[i][j] may indicate the average bit rate of the j-th subset of the i-th layer set, in bits per second. The value is given by BitRateBPS(avg_bit_rate[i][j]) with the function BitRateBPS( ) being specified as follows: BitRateBPS(x)=(x & (214−1))*10(2+(x>>14))

The average bit rate is derived according to the access unit removal time specified in clause F.13. In the following, bTotal is the number of bits in all NAL units of the j-th subset of the i-th layer set, t1 is the removal time (in seconds) of the first access unit to which the VPS applies, and t2 is the removal time (in seconds) of the last access unit (in decoding order) to which the VPS applies. With x specifying the value of avg_bit_rate[i][j], the following applies:

If t1 is not equal to t2, the following condition shall be true: (x & (214−1))==Round(bTotal ((t2−t1)*10(2+(x>>14))))

Otherwise (t1 is equal to t2), the following condition shall be true: (x & (214−1))==0 max_bit_rate_layer[i][j] indicates an upper bound for the bit rate of the j-th subset of the i-th layer set in any one-second time window of access unit removal time as specified in clause F.13. The upper bound for the bit rate in bits per second is given by BitRateBPS(max_bit_rate_layer [i][j]). The bit rate values are derived according to the access unit removal time specified in clause F.13. In the following, t1 is any point in time (in seconds), t2 is set equal to t1+1+100, and bTotal is the number of bits in all NAL units of access units with a removal time greater than or equal to t1 and less than t2. With x specifying the value of max_bit_rate_layer [i][j], the following condition shall be obeyed for all values of t1:

(x&(214−1))>=bTotal+((t2−t1)*10(2+(x>>14)))

constant_pic_rate_idc[i][j] may indicate whether the picture rate of the j-th subset of the i-th layer set is constant. In the following, a temporal segment tSeg is any set of two or more consecutive access units, in decoding order, of the j-th subset of the i-th layer set, auTotal(tSeg) is the number of access units in the temporal segment tSeg, t1(tSeg) is the removal time (in seconds) of the first access unit (in decoding order) of the temporal segment tSeg, t2(tSeg) is the removal time (in seconds) of the last access unit (in decoding order) of the temporal segment tSeg, and avgPicRate(tSeg) is the average picture rate in the temporal segment tSeg, and is specified as follows:

avgPicRate(tSeg)==Round(total(Seg)*256+(t2(tSeg)−t1 (tSeg)))

If the j-th subset of the i-th layer set only contains one or two access units or the value of avgPicRate(tSeg) is constant over all the temporal segments, the picture rate is constant; otherwise, the picture rate is not constant.

constant_pic_rate_idc[i][j] equal to 0 may indicate that the picture rate of the j-th subset of the i-th layer set is not constant. constant_pic_rate_idc[i][j] equal to 1 indicates that the picture rate of the j-th subset of the i-th layer set is constant. constant_pic_rate_idc[i][j] equal to 2 indicates that the picture rate of the j-th subset of the i-th layer set may or may not be constant. The value of constant_pic_rate_idc[i] [j] shall be in the range of 0 to 2, inclusive.

avg_pic_rate[i] may indicate the average picture rate, in units of picture per 256 seconds, of the j-th subset of the layer set. With auTotal being the number of access units in the j-th subset of the i-th layer set, t1 being the removal time (in seconds) of the first access unit to which the VPS applies, and t2 being the removal time (in seconds) of the last access unit (in decoding order) to which the VPS applies, the following applies:

If t1 is not equal to t2, the following condition shall be true: avg_pic_rate[i]==Round(auTotal*256+(t2−t1))

Otherwise (t1 is equal to t2), the following condition shall be true: avg_pic_rate[i]==0

In another embodiment the avg_bit_rate[i][j] and avg_pic_rate[i] may be defined differently that above while still indicating average bit rate and average picture rate (i.e. average frame rate).

In one variant embodiment: If vps_vui_present_flag in VPS is equal to 1, pic_rate_present_vps_flag is equal to 1 and pic_rate_present_flag[i][j] is equal to 1 then it is required that constant_pic_rate_idc[i][j] is set equal to 1.

In another variant embodiment: It is required that vps_vui_present_flag in VPS is set equal to 1, pic_rate_present_vps_flag is set equal to 1, pic_rate_present_flag[i][j] is set equal to 1 and constant_pic_rate_idc[i][j] is set equal to 1 for all i, for all j.

In another variant embodiment: It is required that vps_vui_present_flag in VPS is set equal to 1, pic_rate_present_vps_flag is set equal to 1, pic_rate_present_flag[i][j] is set equal to 1 and constant_pic_rate_idc[i][j] is set equal to 1 for all i, corresponding to the layer set to be carried in the video subsystem of this specification for j equal to the maximum value of the temporal sub-layers to be carried in the video subsystem of this specification.

In one embodiment If vps_num_hrd_parameters is greater than 0 then for each hrd_parameters( ) syntax structure in VPS that applies to layer set to be carried in the video subsystem of this specification:

in one variant in hrd_parameters( ) syntax structure in VPS: fixed_pic_rate_general_flag[i] is required to be set equal to 1 or fixed_pic_rate_within_cvs_flag[i] is required to be set equal to 1 for all value of 1 in the range 0 to maxNumSubLayersMinus1, inclusive.

in another variant in hrd_parameters( ) syntax structure in VPS: fixed_pic_rate_general_flag[i] is required to be set equal to 1 or fixed_pic_rate_within_cvs_flag[i] is required to be set equal to 1 for i equal to maxNumSubLayersMinus1.

In one embodiment for the layer set to be carried in the video subsystem of this specification the list of allowed values for avg_pic_rate[i][j] may be restricted to: 24*256, 30*256, 60*256, 120*256, (24/1.001)*256, (30/1.001)*256, (60/1.001)*256, (120/1.001)*256. Thus in one embodiment it will be a requirement of the bitstream conformance for the coded video bitstream that for the layer set to be carried in the video subsystem of this specification the list of allowed values for avg_pic_rate[i][j] may be restricted to: 24*256, 30*256, 60*256, 120*256, (24/1.001)*256, (30/1.001)*256, (60/1.001)*256, (120/1.001)*256.

In one embodiment it is required that if an access unit includes a picture with nuh_layer_id>0 then it is required to include a picture with nuh_layer_id equal to 0. Thus in one embodiment it will be a requirement of the bitstream conformance for the coded video bitstream that if an access unit includes a picture with nuh_layer_id>0 then it is required to include a picture with nuh_layer_id equal to 0.

In one variant embodiment the syntax element elemental_duration_in_tc_minus1[i] in hrd_parameters( ) syntax structure in VPS corresponding to the layer set to be carried in the video subsystem of this specification is required to have the same value as the value of the syntax element elemental_duration_in_tc_minus1[i] in the hrd_parameters ( ) syntax structure in SPS for each i.

Thus in one embodiment it will be a requirement of the bitstream conformance for the coded video bitstream that the syntax element elemental_duration_in_tc_minus1[i] in hrd_parameters( ) syntax structure in VPS corresponding to the layer set to be carried in the video subsystem of this specification is required to have the same value as the value of the syntax element elemental_duration_in_tc_minus1[i] in the hrd_parameters( ) syntax structure in SPS for each i.

In another variant embodiment the syntax element elemental_duration_in_tc_minus1[i] in hrd_parameters( ) syntax structure in VPS applicable to each layer is required to have the same value for each layer.

Thus in one embodiment it will be a requirement of the bitstream conformance for the coded video bitstream that the syntax element elemental_duration_in_tc_minus1[i] in hrd_parameters( ) syntax structure in VPS applicable to each layer is required to have the same value for each layer.

elemental_duration_in_tc_minus1[i] plus 1 (when present) may specify, when HighestTid is equal to i, the temporal distance, in clock ticks, between the elemental units that specify the HRD output times of consecutive pictures in output order as specified below. The value of elemental_duration_in_tc_minus1[i] shall be in the range of 0 to 2047, inclusive.

For each picture n that is output and not the last picture in the bitstream (in output order) that is output, the value of the variable DpbOutputElementalInterval[n] is specified by: DpbOutputElementalInterval[n]=DpbOutputInterval[n]+ Delta-ToDivisor, where DpbOutputInterval[n] is specified in Equation C-17 in HEVC specification and DeltaToDivisor is specified in Table X based on the value of frame_field_info_present_flag and pic_struct for the CVS containing picture n. Entries marked "-" in Table X indicate a lack of dependence of DeltaToDivisor on the corresponding syntax element.

When HighestTid is equal to i and fixed_pic_rate_general_flag[i] is equal to 1 for a CVS containing picture n, the value computed for DpbOutputElementalInterval[n] shall be equal to ClockTick*(elemental_duration_in_tc_minus1[i]+ 1), wherein ClockTick is as specified in Equation C-2 in HEVC specification (using the value of ClockTick for the CVS containing picture n) when one of the following conditions is true for the following picture in output order nextPicInOutputOrder that is specified for use in Equation C-17 in HEVC specification:

picture nextPicInOutputOrder is in the same CVS as picture u.

picture nextPicInOutputOrder is in a different CVS and fixed_pic_rate_general_flag[i] is equal to 1 in the CVS containing picture nextPicInOutputOrder, the value of ClockTick is the same for both CVSs, and the value of elemental_duration_in_tc_minus1[i] is the same for both CVSs.

When HighestTid is equal to i and fixed_pic_rate_within_cvs_flag[i] is equal to 1 for a CVS containing picture n, the value computed for DpbOutputElementalInterval[n] shall be equal to ClockTick*(elemental_duration_in_tc_minus1[i]+1), wherein ClockTick is as specified in Equation C-2 in HEVC specification (using the value of ClockTick for the CVS containing picture n) when the following picture in output order nextPicInOutputOrder that is specified for use in Equation C-17 in HEVC specification is in the same CVS as picture n.

TABLE X

Divisor for computation of DpbOutputElementalInterval [n]

| frame_field_info_present_flag | pic_struct | DeltaToDivisor |
|---|---|---|
| 0 | — | 1 |
| 1 | 1 | 1 |
| 1 | 2 | 1 |
| 1 | 0 | 1 |
| 1 | 3 | 2 |
| 1 | 4 | 2 |
| 1 | 5 | 3 |
| 1 | 6 | 3 |
| 1 | 7 | 2 |
| 1 | 8 | 3 |
| 1 | 9 | 1 |
| 1 | 10 | 1 |
| 1 | 11 | 1 |
| 1 | 12 | 1 |

It is to be understood that any of the features, whether indicated as shall or necessary, may be omitted as desired. In addition, the features may be combined in different combinations, as desired.

The term "computer-readable medium" refers to any available medium that can be accessed by a computer or a processor. The term "computer-readable medium," as used herein, may denote a computer- and/or processor-readable medium that is nontransitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods or approaches described herein may be implemented in and/or realized using a chipset, an ASIC, a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for encoding a video bitstream by an encoder device, the method including:
   selecting scalable high efficiency video coding (SHVC) as a video codec for a video subsystem of an ATSC 3.0 standard;
   using a restriction regarding the SHVC;
   generating the video bitstream complying with one or more bitstream constraints, when the SHVC is selected, wherein the video bitstream contains a base layer and an enhancement layer;
   encoding a value of a fixed picture rate general flag syntax element equal to one, for each hypothetical reference decoder parameters syntax structure in a video parameter set that applies to a layer set of the base layer and the enhancement layer to be carried in the video subsystem, and encoding a value of a fixed picture rate coded video sequence flag syntax element equal to zero, for each hypothetical reference decoder parameters syntax structure in the video parameter set that applies to the layer set to be carried in the video subsystem, if a value of a parameter specifying a number of hypothetical reference decoder parameters syntax structures in the video parameter set is greater than zero;
   encoding a value of an elemental duration syntax element in the hypothetical reference decoder parameters syntax structure, wherein the elemental duration syntax element is defined for i in a range of 0 to a maximum number of temporal sub-layers minus one; and
   encoding a value of an average picture rate syntax element in a video parameter set video usability information syntax, wherein the average picture rate syntax element indicates an average picture rate, in units of picture per 256 seconds, of a j-th subset of the layer set, wherein
   the value of the elemental duration syntax element in the hypothetical reference decoder parameters syntax structure applicable to the enhancement layer is encoded to be equal to a value of the elemental duration syntax element in the hypothetical reference decoder parameters syntax structure applicable to the base layer, if the value of the parameter is greater than zero;
   a list of allowed values for the average picture rate syntax element for the layer set to be carried in the video subsystem is restricted to 24/1.001 Hz, 24 Hz, 30/1.001 Hz, 30 Hz 60/1.001 Hz, 60 Hz, 120/1.001 Hz, and 120 Hz; and
   producing a bitstream including the video bitstream.

2. A method for decoding a video bitstream by a decoder device, the method including:
   receiving a video bitstream using scalable high efficiency video coding (SHVC) as a video codec for a video subsystem of an ATSC 3.0 standard;
   using a restriction regarding the SHVC;
   determining whether the video bitstream complies with one or more bitstream constraints, when the SHVC is selected, wherein the video bitstream contains a base layer and an enhancement layer;
   decoding a value of a fixed picture rate general flag syntax element equal to one, for each hypothetical reference decoder parameters syntax structure in a video parameter set that applies to a layer set of the base layer and the enhancement layer to be carried in the video subsystem, and decoding a value of a fixed picture rate coded video sequence flag syntax element equal to zero, for each hypothetical reference decoder parameters syntax structure in the video parameter set that applies to the layer set to be carried in the video subsystem, if a value of a parameter specifying a number of hypothetical reference decoder parameters syntax structures in the video parameter set is greater than zero;
   decoding a value of an elemental duration syntax element in the hypothetical reference decoder parameters syntax structure, wherein the elemental duration syntax element is defined for i in a range of 0 to a maximum number of temporal sub-layers minus one; and
   decoding a value of an average picture rate syntax element in a video parameter set video usability information syntax, wherein the average picture rate syntax element indicates an average picture rate, in units of picture per 256 seconds, of a j-th subset of the layer set, wherein
   the value of the elemental duration syntax element in the hypothetical reference decoder parameters syntax structure applicable to the enhancement layer is encoded to be equal to a value of the elemental duration syntax element in the hypothetical reference decoder parameters syntax structure applicable to the base layer, if the value of the parameter is greater than zero;
   a list of allowed values for the average picture rate syntax element for the layer set to be carried in the video subsystem is restricted to 24/1.001 Hz, 24 Hz, 30/1.001 Hz, 30 Hz, 60/1.001 Hz, 60 Hz, 120/1.001 Hz, and 120 Hz; and
   producing decoded video from the video bitstream.

* * * * *